United States Patent
Shiina

(10) Patent No.: US 12,045,141 B2
(45) Date of Patent: Jul. 23, 2024

(54) FILE PROCESSING DEVICE, FILE PROCESSING METHOD, AND PROGRAM

(71) Applicant: Sony Group Corporation, Tokyo (JP)

(72) Inventor: Hiroki Shiina, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 166 days.

(21) Appl. No.: 17/797,962

(22) PCT Filed: Feb. 22, 2021

(86) PCT No.: PCT/JP2021/006575
§ 371 (c)(1),
(2) Date: Aug. 5, 2022

(87) PCT Pub. No.: WO2021/182090
PCT Pub. Date: Sep. 16, 2021

(65) Prior Publication Data
US 2023/0039708 A1 Feb. 9, 2023

(30) Foreign Application Priority Data

Mar. 9, 2020 (JP) .................................. 2020-039881

(51) Int. Cl.
*G06F 11/14* (2006.01)
(52) U.S. Cl.
CPC ...... *G06F 11/1469* (2013.01); *G06F 11/1435* (2013.01); *G06F 11/1451* (2013.01)
(58) Field of Classification Search
CPC ............. G06F 11/1469; G06F 11/1435; G06F 11/1451; H04N 9/8205
See application file for complete search history.

(56) References Cited

U.S. PATENT DOCUMENTS

| | | | |
|---|---|---|---|
| 2015/0138398 A1* | 5/2015 | Hayashi | H04N 25/134 |
| | | | 348/234 |
| 2017/0262342 A1 | 9/2017 | Bai | |
| 2019/0052937 A1 | 2/2019 | Kumar et al. | |

FOREIGN PATENT DOCUMENTS

| | | |
|---|---|---|
| JP | 2005301641 A | 10/2005 |
| JP | 6451102 B2 | 1/2019 |
| WO | 2019/192870 A1 | 10/2019 |
| WO | 2019/193097 A1 | 10/2019 |

OTHER PUBLICATIONS

International Search Report (PCT/ISA/210), International Application No. PCT/JP2021/006575, dated May 25, 2021.
ISO/IEC 23008-12:2017, Information technology—High efficiency coding and media delivery in heterogeneous environments—Part 12: Image File Format.

* cited by examiner

*Primary Examiner* — Jason W Blust
(74) *Attorney, Agent, or Firm* — Michael Best & Friedrich LLP

(57) ABSTRACT

The present technology relates to a file processing device, a file processing method, and a program capable of reducing the number of images that the user loses. Restoration data for restoring a high efficiency image file format (HEIF) file storing a still image is written into the HEIF file. The HEIF file is restored using the restoration data. The present technology can be applied to processing of a HEIF file.

20 Claims, 21 Drawing Sheets

FIG. 20

| FIELD NAME | MEANING |
|---|---|
| recovery_data_size | RESTORATION DATA SIZE (byte) |
| image_size | IMAGE DATA SIZE (byte) |
| next_image_exist | NEXT IMAGE EXISTS? (1: YES, 0: NO) |
| info_type | INFO TYPE (e.g., I-PICTURE) |
| target_size_x | VERTICAL SIZE OF OVERALL IMAGE |
| target_size_y | HORIZONTAL SIZE OF OVERALL IMAGE |
| num_of_grid_x | NUMBER OF DIVISIONS IN VERTICAL DIRECTION |
| num_of_grid_y | NUMBER OF DIVISIONS IN HORIZONTAL DIRECTION |
| grid_width | VERTICAL SIZE OF ONE grid WHEN DIVIDED IN VERTICAL DIRECTION |
| grid_height | HORIZONTAL SIZE OF ONE grid WHEN DIVIDED IN HORIZONTAL DIRECTION |
| grid_list | GRID INFORMATION |
| capture_gamma | GAMMA INFORMATION |
| colormetory | COLORIMETRY INFORMATION |
| hvcc_info | hvcc INFORMATION (NOT INCLUDING SPS, PPS, VPS, OR THE LIKE) |

FIG. 21

| FIELD NAME | MEANING |
|---|---|
| param_addr | PARAMETER (VPS, SPS, PPS) ADDRESS |
| param_size | PARAMETER (VPS, SPS, PPS) SIZE |
| data_addr | ES DATA ADDRESS |
| data_size | ES DATA SIZE |
| total_vps_size | VPS SIZE |
| num_vps | NUMBER OF VPSs |
| vps_id | VPS ID (NALUnit ID) |
| total_sps_size | SPS SIZE |
| num_sps | NUMBER OF SPSs |
| sps_id | SPS ID (NALUnit ID) |
| total_pps_size | PPS SIZE |
| num_pps | NUMBER OF PPSs |
| pps_id | PPS ID (NALUnit ID) |

FIG. 23

| Box NAME | MEANING | RELATED FIELD | GENERATION METHOD |
|---|---|---|---|
| ftyp | FILE TYPE | NONE | GENERATE USING FIXED VALUE. |
| meta | IMAGE INFORMATION | NONE | OBTAIN SIZE OF EVERY Box STORED IN meta. |
| ├─hdlr | HANDLER | NONE | GENERATE USING FIXED VALUE. |
| ├─pitm | MAIN item | num_of_grid_x, num_of_grid_y | item_ID: 1 IF THERE IS NO grid, item_ID: num_of_grid_x×num_of_grid_y+1 IF THERE IS grid. |
| ├─iinf | INFORMATION OF EACH item | NONE | OBTAIN SIZE OF EVERY Box STORED IN iprp. OBTAIN TOTAL NUMBER OF infes. |
| │ └─infe | INFORMATION OF INDIVIDUAL item | num_of_grid_x, num_of_grid_y | ADD NUMBER OF SCN, thumb, EXIF, AND XMP TO NUMBER OF COMPONENTS OF grid num_of_grid_x×num_of_grid. |
| ├─iref | REFERENCE OF item | NONE | OBTAIN SIZE OF EVERY Box STORED IN iref. |
| │ ├─dimg | item OF grid CONFIGURATION | num_of_grid_x, num_of_grid_y | OBTAIN NUMBER OF COMPONENTS OF grid FROM NUMBER OF COMPONENTS IN VERTICAL DIRECTION × NUMBER OF COMPONENTS IN HORIZONTAL DIRECTION. |
| │ └─thmb | thmb-RELATED item | target_size_x, target_size_y | OBTAIN items HAVING SCN AND thumb SIZES. |
| │ └─cdsc | meta INFORMATION-RELATED item | NONE | BY UNIQUELY DETERMINING ORDER OF IMAGE-RELATED DATA, OBTAIN ITEM IDs OF EXIF AND XMP BASED ON item HAVING thumb SIZE. |
| ├─iprp | item PROPERTY | NONE | OBTAIN SIZE OF EVERY Box STORED IN iprp. |
| │ ├─ipco | item property CONTAINER | NONE | OBTAIN SIZE OF EVERY Box STORED IN ipco. |
| │ │ ├─colr | COLOR INFORMATION | capture_gamma, colormetory | GENERATE EACH FIELD OF Box USING RELATED FIELD. |
| │ │ ├─hvcc | CODEC INFORMATION | hvcc_info, grid_list | GENERATE EACH FIELD OF Box USING RELATED FIELD. |
| │ │ ├─ispe | SIZE | target_size_x, target_size_y | GENERATE EACH FIELD OF Box USING VALUE OF RELATED FIELD. |
| │ │ └─irot | ROTATION INFORMATION | NONE | GENERATE USING FIXED VALUE. |
| │ └─ipma | PROPERTY ASSOCIATION | NONE | GENERATE USING infe BOX AND EACH PROPERTY IN ipco BOX ASSOCIATED WITH THE infe BOX. |
| └─idat | grid item INFORMATION | grid_list, grid_width, grid_height, num_of_grid_x, num_of_grid_y | GENERATE EACH FIELD OF Box USING RELATED FIELD. |
| ├─iloc | item LOCATION | grid_list | GENERATE EACH FIELD OF Box USING RELATED FIELD. |
| mdat | ACTUAL AV DATA | grid_list | CALCULATE SIZE OF ACTUALLY USED DATA BY grid_list. |

FILE PROCESSING DEVICE, FILE PROCESSING METHOD, AND PROGRAM

TECHNICAL FIELD

The present technology relates to a file processing device, a file processing method, and a program, and particularly relates to, for example, a file processing device, a file processing method, and a program capable of reducing the number of images that the user loses.

BACKGROUND ART

As a file format for efficiently storing images, there is a high efficiency image file format (HEIF) (see Non-Patent Document 1).

CITATION LIST

Non-Patent Document

Non-Patent Document 1: ISO/IEC 23008-12:2017, Information technology—High efficiency coding and media delivery in heterogeneous environments—Part 12: Image File Format

SUMMARY OF THE INVENTION

Problems to be Solved by the Invention

A HEIF file can store, for example, images of a plurality of still images such as images captured by continuous shooting. In a case where a HEIF file stores a plurality of images, the writing time required for writing (recording) the HEIF file increases as the number of images increases. In a case where the writing time is long, there is a high possibility that an abnormal HEIF file is generated during writing of the HEIF file due to power interruption caused by removal of a battery or removal of a plug, removal of a medium, or the like. An abnormal HEIF file is a file that does not have a format as a HEIF file.

An abnormal HEIF file cannot be reproduced, and the user loses all the images to be stored in the HEIF file.

The present technology has been made in view of such a situation, and aims to reduce the number of images that the user loses.

Solutions to Problems

A first file processing device or a first program of the present technology is a file processing device including a file control unit that writes restoration data for restoring a high efficiency image file format (HEIF) file storing a still image into the HEIF file, or a program for causing a computer to function as such a file processing device.

A first file processing method of the present technology is a file processing method including writing restoration data for restoring a high efficiency image file format (HEIF) file storing a still image into the HEIF file.

In the first file processing device, the first file processing method, and the first program of the present technology, restoration data for restoring a high efficiency image file format (HEIF) file storing a still image is written into the HEIF file.

A second file processing device or a second program of the present technology is a file processing device including a file control unit that uses restoration data for restoring a high efficiency image file format (HEIF) file storing a still image to restore the HEIF file into which the restoration data is written, or a program for causing a computer to function as such a file processing device.

A second file processing method of the present technology is a file processing method including using restoration data for restoring a high efficiency image file format (HEIF) file storing a still image to restore the HEIF file into which the restoration data is written.

In the second file processing device, the second file processing method, and the second program of the present technology, restoration data for restoring a high efficiency image file format (HEIF) file storing a still image is used to restore the HEIF file into which the restoration data is written.

Note that the file processing device may be an independent device, or may be an internal block included in one device.

Additionally, the program can be provided by being transmitted through a transmission medium or being recorded on a recording medium.

BRIEF DESCRIPTION OF DRAWINGS

FIG. 20 is a diagram illustrating a specific example of restoration data.

FIG. 21 is a diagram illustrating a specific example of grid information (field) grid_list in the restoration data.

FIG. 23 is a diagram illustrating methods of generating (restoring) boxes that store management metadata generated using at least restoration data in the restoration processing.

MODE FOR CARRYING OUT THE INVENTION

One Embodiment of Digital Camera to which Present Technology is Applied

Figure 1:
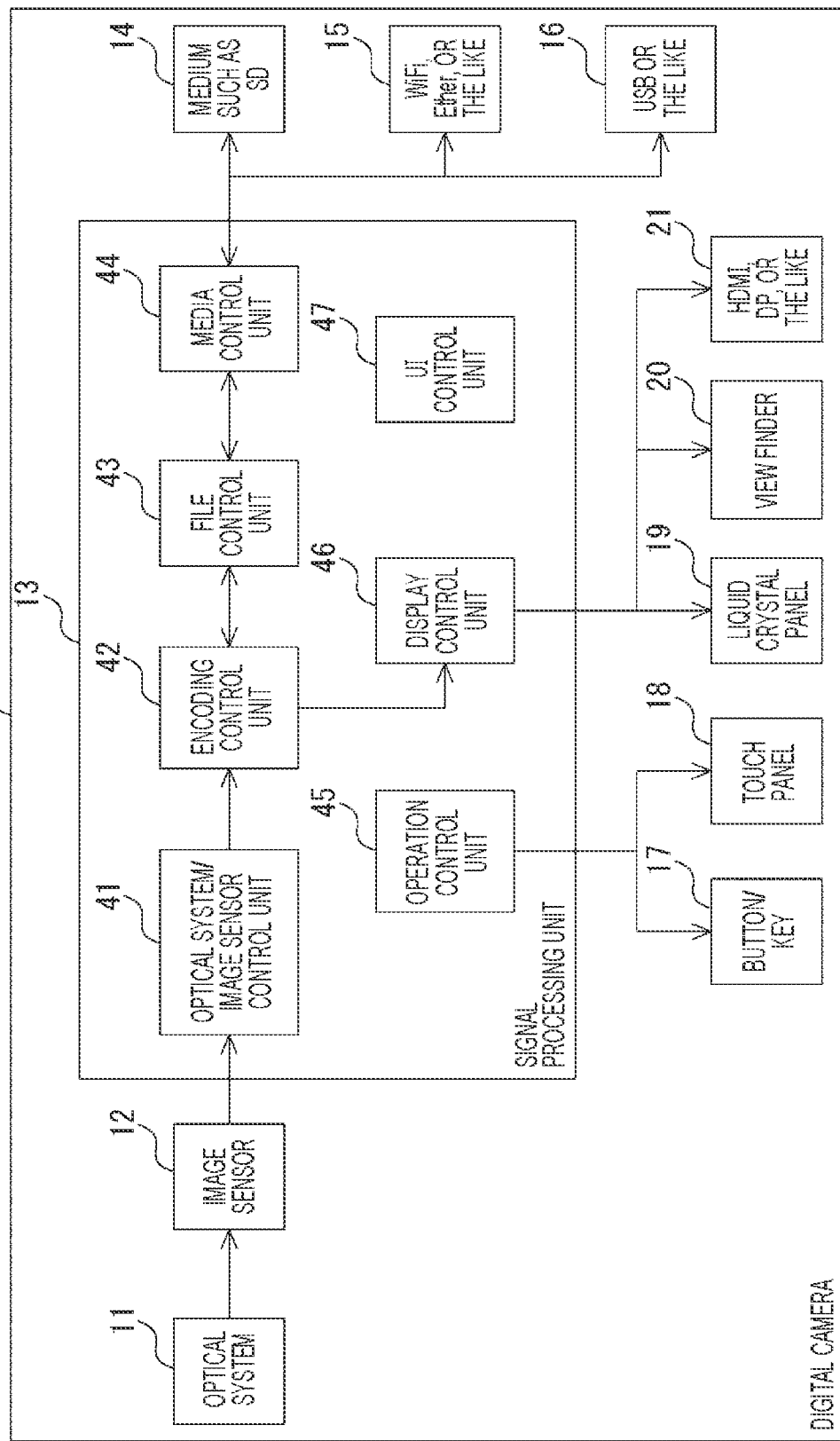
FIG. 1 is a block diagram illustrating a configuration example of one embodiment of a digital camera to which the present technology is applied.

FIG. 1 is a block diagram illustrating a configuration example of one embodiment of a digital camera to which the present technology is applied.

A digital camera 10 includes an optical system 11, an image sensor 12, a signal processing unit 13, a medium 14, interfaces (I/F) 15 and 16, a button/key 17, a touch panel 18, a liquid crystal panel 19, a view finder 20, an I/F 21, and the like.

The optical system 11 condenses light from a subject on the image sensor 12.

The image sensor 12 receives light from the optical system 11, performs imaging by photoelectric conversion, generates image data as an electric signal, and supplies the image data to the signal processing unit 13.

The signal processing unit 13 includes an optical system/image sensor control unit 41, an encoding control unit 42, a file control unit 43, a media control unit 44, an operation control unit 45, a display control unit 46, and a UI control unit 47.

The optical system/image sensor control unit 41 controls the optical system 11 and the image sensor 12, and supplies (data of) an image obtained by imaging performed in accordance with the control to the encoding control unit 42.

The encoding control unit 42 supplies the image from the optical system/image sensor control unit 41 to the display control unit 46, encodes the image as necessary, and supplies the image to the file control unit 43. Additionally, the encoding control unit 42 decodes the image supplied from the file control unit 43 as necessary, and supplies the image to the display control unit 46.

The file control unit 43 generates a file storing the image supplied from the encoding control unit 42, and supplies the file to the media control unit 44. Additionally, the file control unit 43 reproduces the file supplied from the media control unit 44, that is, reads data such as an image stored in the file, and the like. For example, an image read from the file is supplied from the file control unit 43 to the encoding control unit 42.

The media control unit 44 controls exchange of files with the medium 14 and the I/Fs 15 and 16. For example, the media control unit 44 causes a file from the file control unit 43 to be recorded on the medium 14 or to be transmitted from the I/Fs 15 and 16. Additionally, the media control unit 44 reads a file from the medium 14, or causes the I/Fs 15 and 16 to receive a file and supplies the file to the file control unit 43.

The operation control unit 45 supplies an operation signal corresponding to an operation to a necessary block according to the operation of the button/key 17 or the touch panel 18 by the user.

The display control unit 46 performs display control and the like to supply an image and the like supplied from the encoding control unit 42 to the liquid crystal panel 19, the view finder 20, and the I/F 21 to display.

The UI control unit 47 manages user interface (UI) control.

The medium 14 is, for example, a storage medium such as an SD card. The I/F 15 is, for example, an I/F of a local area network (LAN) such as Wi-Fi (registered trademark) or Ethernet (registered trademark). The I/F 16 is, for example, a universal serial bus (USB) I/F. The button/key 17 and the touch panel 18 are operated by the user when inputting a command or other information to the digital camera 10. The touch panel 18 can be formed integrally with the liquid crystal panel 19. The liquid crystal panel 19 and the view finder 20 display an image and the like supplied from the display control unit 46. The I/F 21 is an I/F that transmits at least an image such as a high-definition multimedia interface (HDMI) (registered trademark) or a display port (DP).

In the digital camera 10 configured as described above, the optical system/image sensor control unit 41 generates, from an image of RAW data (hereinafter also referred to as RAW image) obtained by imaging by the image sensor 12, an image of YUV having the same resolution (number of pixels) (size) as that of the RAW image, for example, and supplies the image to the encoding control unit 42 together with the RAW image. The encoding control unit 42 generates a master image or the like of the HEIF file from the YUV image from the optical system/image sensor control unit 41. For example, the YUV image from the optical system/image sensor control unit 41 can be directly used as the master image of the HEIF file.

The encoding control unit 42 generates, from the master image of YUV, an image of YUV (hereinafter also referred to as screennail image) having a resolution lower than that of the master image, for example, as a first other image based on the master image for use in display on the liquid crystal panel 19 or an external display, and generates an image of YUV (hereinafter also referred to as thumbnail image) having a resolution lower than that of the screennail image, for example, as a second other image based on the master image for use in index display (list display). For example, the encoding control unit 42 supplies the screennail image to the liquid crystal panel 19 via the display control unit 46 to display the screennail image as a so-called through-the-lens image. As the thumbnail image, for example, an image having a size of 320 pixels or less on the long side can be adopted. The ratio of the size (number of pixels) between the master image and the screennail image as the first other image based on the master image or the thumbnail image as the second other image based on the master image can be, for example, 200 times or less. The ratio of the size between the screennail image as the first other image based on the master image and the thumbnail image as the second other image based on the master image may also be 200 times or less. As the screennail image, for example, an image having a resolution of 4K or more can be adopted. Additionally, as the screennail image, for example, a 4K (QFHD) or FHD image can be adopted according to the user's selection. Furthermore, images having the same resolution can be adopted as the master image and the screennail image. In a case where images having the same resolution are adopted as the master image and the screennail image, both the master image and the screennail image can be stored in the HEIF file, or the master image can be stored without storing the screennail image. In a case where the master image is stored in the HEIF file without storing the screennail image, the master image can be resized and used as a screennail image.

Additionally, the encoding control unit 42 encodes a master image, a screennail image, and a thumbnail image corresponding to a RAW image (main image, screennail image, and thumbnail image generated from same RAW image) as necessary, and supplies them to the file control unit 43 together with the RAW image.

The file control unit 43 generates a RAW file storing a RAW image, a HEIF file storing a corresponding master image, screennail image, and thumbnail image (main image, screennail image, and thumbnail image generated from same RAW image), and/or a JPEG file, for example, as necessary, and supplies the generated file to the media control unit 44. A HEIF file is a file conforming to high efficiency image file format (HEIF), and a JPEG file is a file conforming to joint photographic experts group (JPEG).

The media control unit 44 records the RAW file, the HEIF file, or the JPEG file from the file control unit 43 on the medium 14 or transmits the RAW file, the HEIF file, or the JPEG file from the I/F 15 or 16.

The type (e.g., RAW file, HEIF file, JPEG file, and the like) of the file to be generated by the file control unit 43 can be selected according to a user's operation (designation), for example. Additionally, as will be described later, a HEIF file includes an image item format and an image sequence format. Which one of the image item format and the image sequence format is adopted can be selected according to a user's operation, for example. Furthermore, the file control unit 43 can perform the mutual conversion between a HEIF file and a JPEG file according to the user's operation.

Additionally, the file control unit 43 can generate a plurality of files having the same image content and having different codecs, image sizes (resolutions), color formats, and bit depths.

In a case where the file control unit 43 generates a plurality of files having the same image content, the encoding control unit 42 generates an image stream (file stream) to be stored in each of the plurality of files from a YUV image from the optical system/image sensor control unit 41.

The encoding control unit 42 can generate image streams having different codecs, image sizes (resolutions), color formats, and bit depths.

For example, the encoding control unit 42 can generate an image of a predetermined size, a predetermined color format, and a predetermined bit depth from a YUV image supplied from the optical system/image sensor control unit 41, and generate a first stream obtained by encoding the image with a predetermined codec (encoding method). Furthermore, the encoding control unit 42 can generate an image having another size, another color format, and another bit depth from the same YUV image supplied from the optical system/image sensor control unit 41, and generate a second stream obtained by encoding the image with another codec.

Then, the file control unit 43 can generate a file storing the first stream and a file storing the second stream.

<JPEG File>

Figure 2:
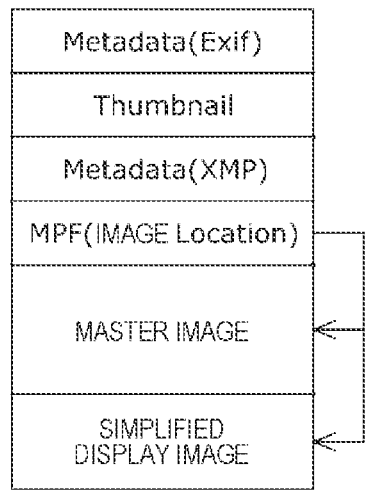
FIG. 2 is a diagram illustrating an example of a format of a joint photographic experts group (JPEG) file compliant with JPEG.

FIG. 2 is a diagram illustrating an example of a format of a joint photographic experts group (JPEG) file compliant with JPEG.

A JPEG file is configured to store, for example, Exif (EXIF) metadata, a thumbnail image, extensible metadata platform (XMP) (registered trademark) metadata, MPF representing storage positions (locations) of a master image and a simplified display image, a master image, and a simplified display image. As the simplified display image, a screennail image can be adopted, for example.

<ISO Base Media File Format>

Figure 3:
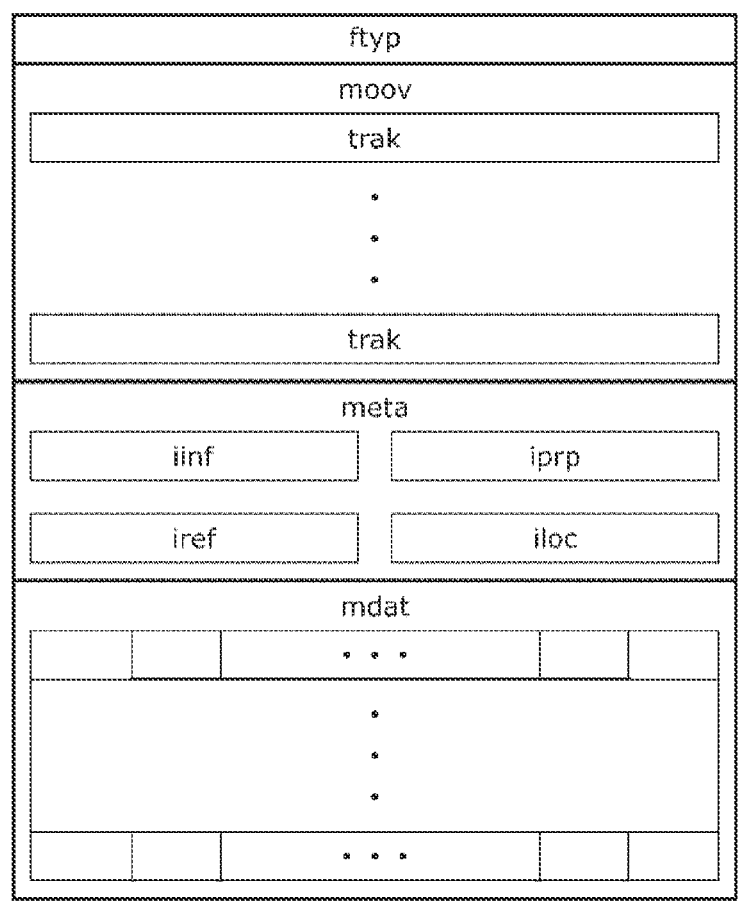
FIG. 3 is a diagram illustrating an example of an ISO base media file format.

FIG. 3 is a diagram illustrating an example of an ISO base media file format.

HEIF (ISO/IEC 23008-12) is a file format conforming to the ISO base media file format (ISO/IEC 14496-12), and therefore, a HEIF file conforms to the ISO base media file format.

The ISO base media file format includes units called boxes as containers for storing data, and has a structure called a box structure.

Boxes include a type (box type), actual data (data), and the like. A type indicates the type of actual data in the box. Reproducible media data such as an image (still image, moving image), audio, and subtitles, an attribute name (field name) and an attribute value (field value) of (variable represented by) the attribute name, and various other data can be adopted as actual data.

Furthermore, a box can be adopted as actual data. That is, a box can have a box as actual data, and thus a hierarchical structure can be formed.

A base media file conforming to the ISO base media file format can include an ftyp box, a moov box (MovieBox), a meta box (MetaBox), an mdat box (MediaDataBox), and the like. An ftyp box stores identification information for identifying a file format. A moov box can store a trak box and the like. A meta box can store an iinf box, an iprp box, an iref box, an iloc box, and the like. An mdat box can store media data (AV data) and other arbitrary data.

HEIF conforms to the ISO base media file format as described above.

<HEIF File>

Figure 4:
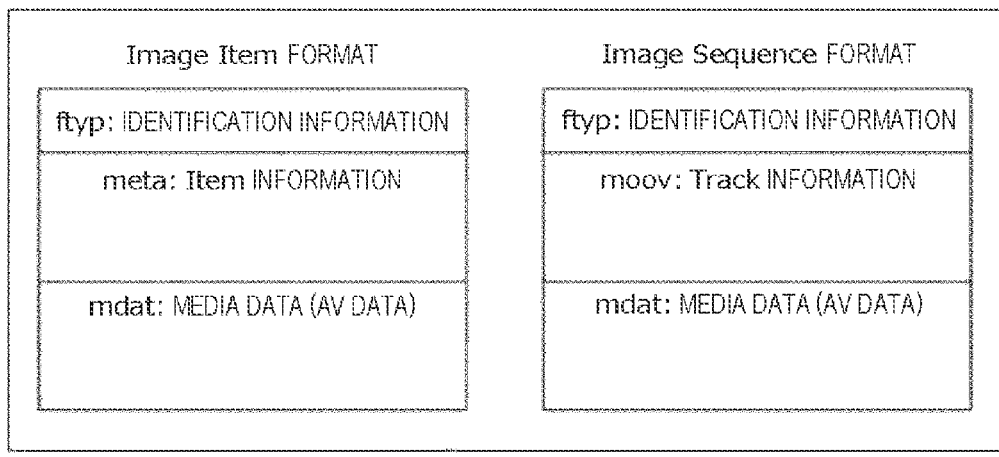
FIG. 4 is a diagram illustrating an example of a format of a HEIF file conforming to HEIF.

FIG. 4 is a diagram illustrating an example of a format of a HEIF file conforming to HEIF.

HEIF files are roughly divided into an image item format and an image sequence format. Furthermore, the image item format includes a single image format having only one item, which will be described later, and an image collection format having a plurality of items.

A HEIF file in the image item format includes an ftyp box, a meta box, and an mdat box.

A HEIF file in the image sequence format includes an ftyp box, a moov box, and an mdat box.

Note that a HEIF file can include not only one of the meta box and the moov box but also both of them.

The ftyp box stores identification information for identifying a file format, such as whether the file is a HEIF file in an image item format or an image sequence format.

The meta box and the moov box store metadata necessary for reproduction, management, and the like of media data stored in the mdat box such as metadata of a storage location or the like of media data The mdat box stores media data (AV data) and the like.

In the digital camera 10, it is possible to select which of a HEIF file in the image item format and a HEIF file in the image sequence format is to be generated according to the user's operation, for example. Additionally, in a case of encoding and storing an image in the mdat box of a HEIF file, only intra encoding is permitted for the image item format, and intra encoding and inter encoding are permitted for the image sequence format. Therefore, for example, in a case where priority is given to high-speed access to data stored in the HEIF file, generation of a HEIF file in the image item format can be selected, and in a case where priority is given to reducing the size (data amount) of the HEIF file, generation of a HEIF file in the image sequence format can be selected.

Figure 5:
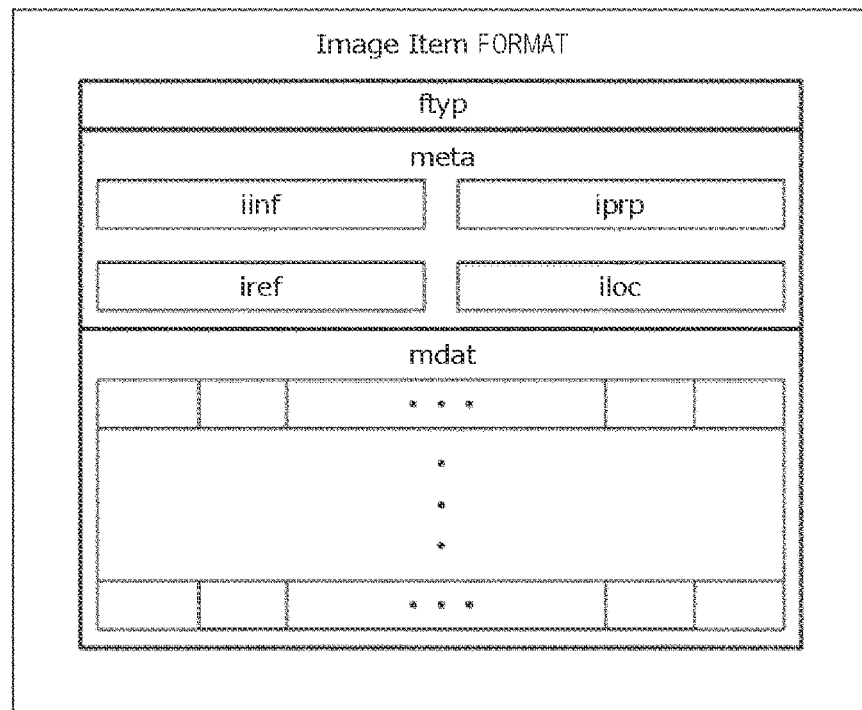
FIG. 5 is a diagram illustrating an example of a format of a HEIF file in an image item format.

FIG. 5 is a diagram illustrating an example of a format of a HEIF file in an image item format.

In a HEIF file in the image item format, the ftyp box stores (as attribute value), for example, information such as mif1 indicating that the HEIF file is in the image item format.

The meta box stores an iinf box, an iref box, an iprp box, and an iloc box.

The iinf box stores (attribute name and attribute value representing) the number of items which are media data (AV data) stored in the mdat box, and the like. An item is one data stored in the mdat box of a HEIF file in the image item format, and for example, one image (screen) is an item. In the present specification, one image is also referred to as a frame regardless of whether it is a still image or a moving image. One frame is one item.

The iref box stores information indicating the association among items. For example, the mdat box can store each of a corresponding master image, screennail image, and thumbnail image as an item. In a case where the mdat box stores an item I1 as a master image, an item I2 as a screennail image, and an item I3 as a thumbnail image, the iref box stores information indicating that the item I2 is a screennail image of the master image as the item I1 and information indicating that the item I3 is a thumbnail image of the master image as the item I1.

The iprp box stores information regarding properties of an item.

The iloc box stores information regarding the storage location of an item stored in the mdat box.

The mdat box (of the HEIF file) in the image item format stores, for example, a frame of an image as an item. The mdat box can store one or more items. Additionally, the mdat box can encode and store a frame as an item. Note, however, that the encoding of a frame as an item stored in the mdat box in the image item format is limited to intra encoding. As an encoding method (codec) for encoding a frame as an item, for example, HEVC or the like can be adopted.

Figure 6:
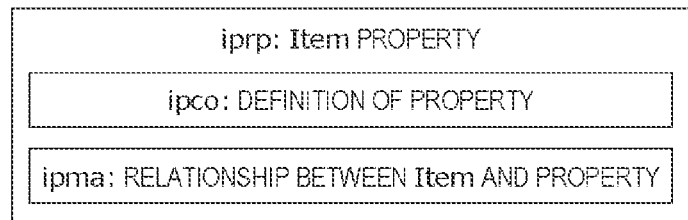
FIG. 6 is a diagram illustrating an example of an iprp box.

FIG. 6 is a diagram illustrating an example of the iprp box in FIG. 5.

The iprp box stores an ipco box and an ipma box related to properties of items. The ipco box stores properties of an item stored in the mdat box such as codec information regarding the codec of an image as an item and image size information regarding the size of the image as an item. The ipma box stores indices (pointers) of items stored in the mdat box to properties stored in the ipco box.

Figure 7:
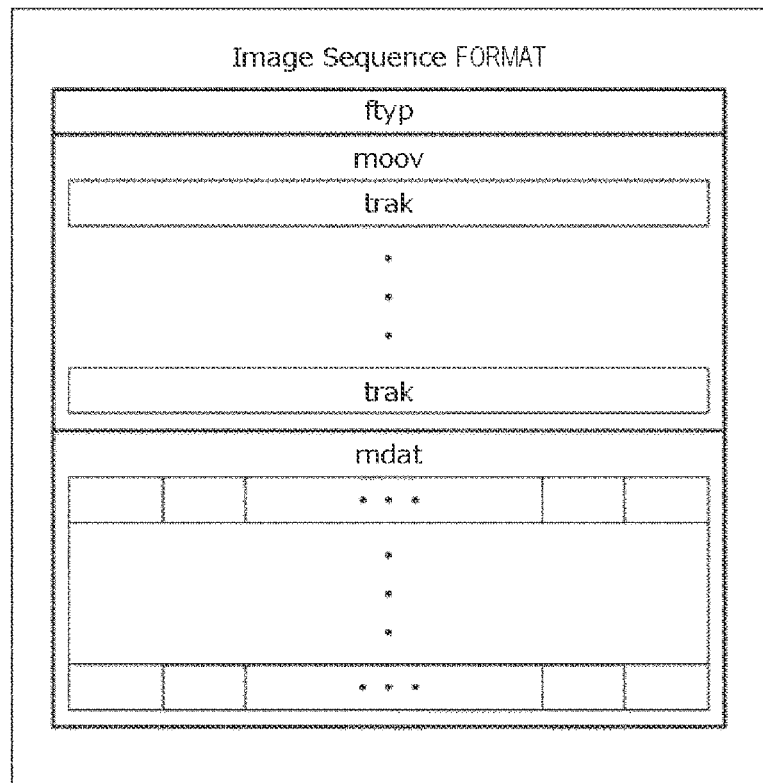
FIG. 7 is a diagram illustrating an example of a format of a HEIF file in an image sequence format.

FIG. 7 is a diagram illustrating an example of a format of a HEIF file in an image sequence format.

In a HEIF file in the image sequence format, the ftyp box stores, for example, information such as msf1 indicating that the HEIF file is in the image sequence format.

The moov box stores a trak box. The trak box stores information regarding a track stored in the mdat box.

A track includes one independent piece of media data reproduced according to a timeline, such as an image or sound. For example, a track includes one or more frames of images that form an elementary stream. As for the track stored in the mdat box, a plurality of tracks, such as tracks of an image and sound recorded at the same time, can be reproduced at the same time.

Media data of the track is configured in units called samples. A sample is a minimum unit (access unit) in a case where media data in a HEIF file is accessed. Therefore, media data in a HEIF file cannot be accessed in units smaller than samples.

For image media data, for example, one frame or the like is one sample. Additionally, for sound media data, for example, one audio frame or the like defined in the standard of the sound media data is one sample.

In the mdat box (of HEIF file) in the image sequence format, media data of a track is arranged in units called chunks. A chunk is a set of one or more samples arranged at logically continuous addresses.

In a case where the mdat box stores a plurality of tracks as media data, the plurality of tracks is interleaved and arranged in units of chunks.

As described above, the mdat box in the image sequence format stores one or more tracks including media data of an image, sound, or the like.

The mdat box can encode and store frames of images included in a track. In the encoding of frames included in a track stored in the mdat box of the image sequence format, long GOP can be adopted as a group of picture (GOP), and both intra encoding and inter encoding can be adopted. As a codec for encoding frames included in a track, HEVC or the like can be adopted, for example.

Figure 8:
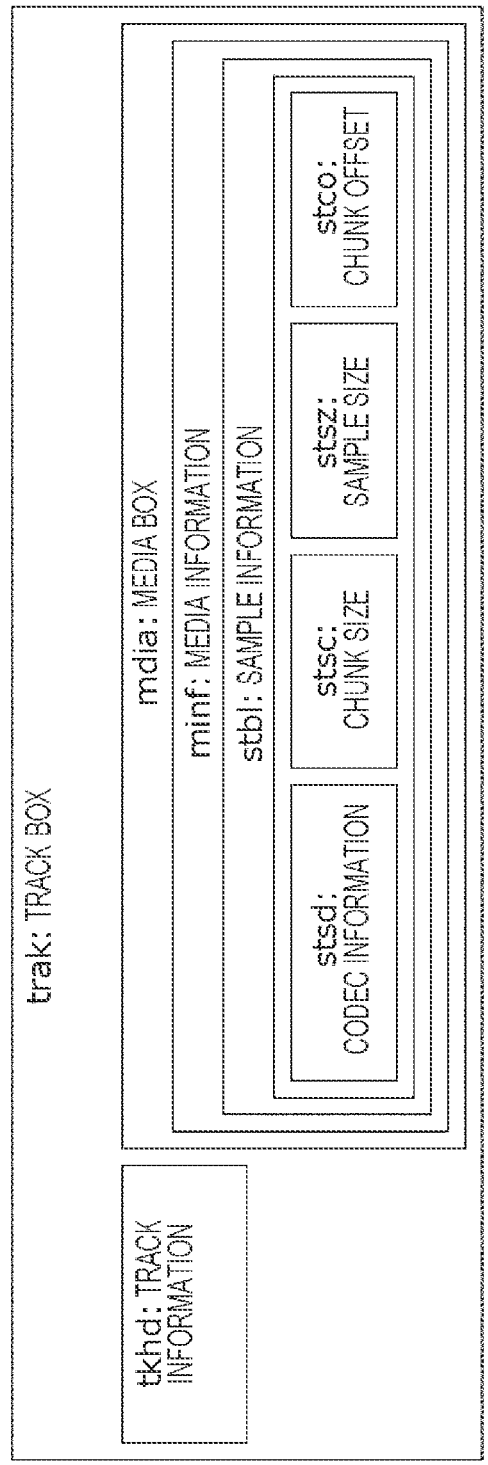
FIG. 8 is a diagram illustrating an example of a trak box.

FIG. 8 is a diagram illustrating an example of the trak box.

The trak box can store the tkhd box and the mdia box. The tkhd box stores header information of a track such as the creation date and time of a track managed by the trak box. The mdia box stores an minf box and the like. The minf box stores an stbl box. The stbl box stores an stsd box, an stsc box, an stsz box, and an stco box that store a sample of a track, and consequently information for accessing a chunk. The stsd box stores codec information regarding the codec of the track. The stsc box stores a chunk size (number of samples per chunk). The stsz box stores a sample size. The stco box stores a chunk offset, that is, the offset of the arrangement location of each chunk of a track stored in the mdat box.

Here, a HEIF file in the image item format is also referred to as a collection file, and a HEIF file in the image sequence format is also referred to as a sequence file.

In the digital camera 10, it is possible to generate a HEIF file storing a master image and one or both of a necessary screennail image and thumbnail image.

<Collection File>

Figure 9:
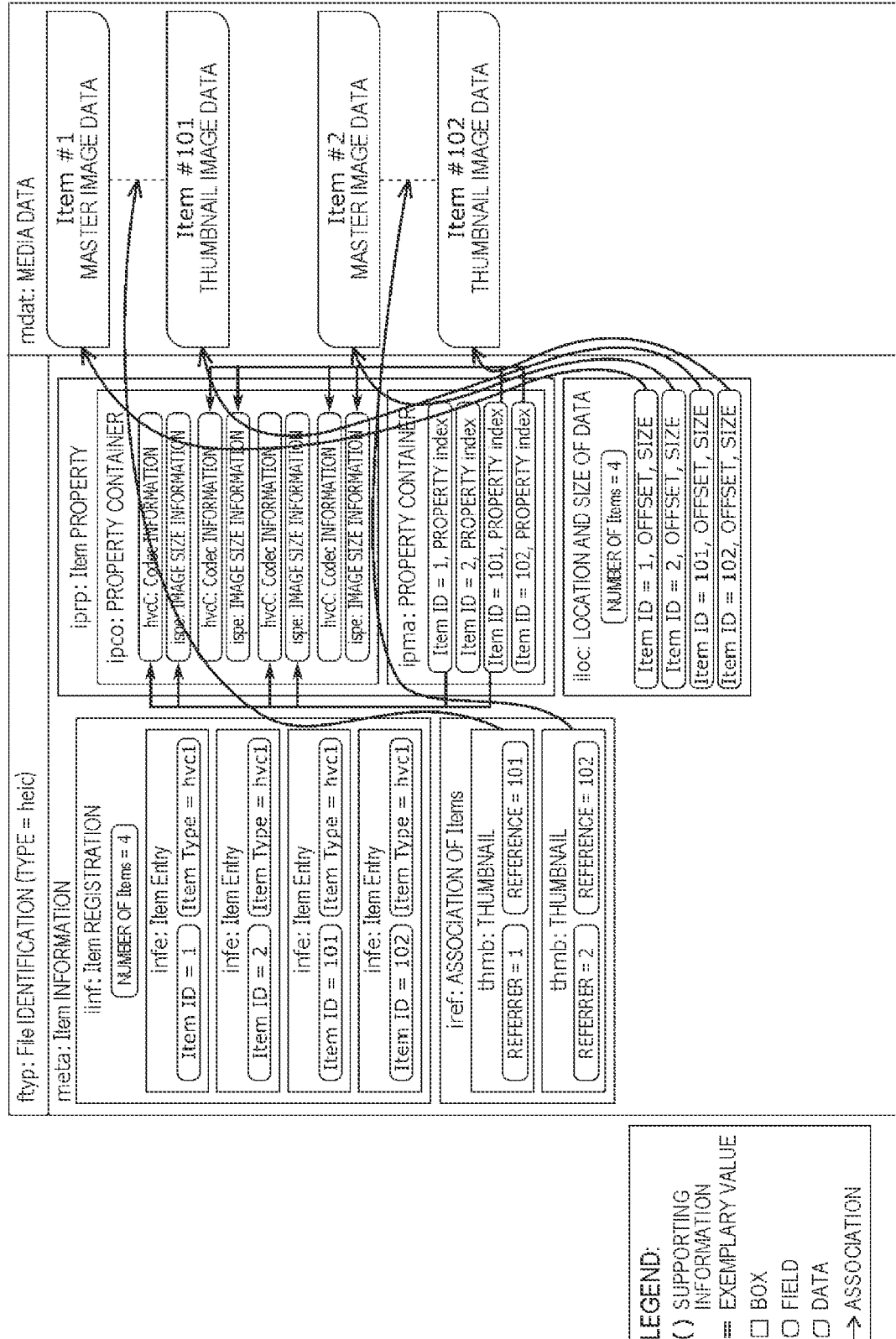
FIG. 9 is a diagram illustrating an example of a collection file storing a master image and a thumbnail image.

FIG. 9 is a diagram illustrating an example of a collection file storing a master image and a thumbnail image.

Here, assume that a frame (item) is encoded by HEVC and stored in the mdat box of the collection file.

The ftyp box stores, as identification information for identifying the file format, heic indicating that the format is the image item format and that the codec is HEVC.

The iinf box stores the number of items stored in the mdat box. In FIG. 9, the mdat box stores a total of four items (frames) including a master image (hereinafter also described as master image Item #1) identified by an item ID #1, a master image Item #2, the thumbnail image (hereinafter also described as thumbnail image Item #101) identified by an item ID #101, and a thumbnail image Item #102. Therefore, the number of items is four. Note that the thumbnail image Item #101 is a thumbnail image of the master image Item #1, and the thumbnail image Item #102 is a thumbnail image of the master image Item #2.

The iinf box further stores an infe box for each item stored in the mdat box, for example. In the infe box, an item ID for identifying an item and an item type are registered. In FIG.

9, there are infe boxes of the master images Item #1 and Item #2 and the thumbnail images Item #101 and Item #102.

The iref box stores, for example, a thmb box as information for associating items stored in the mdat box. The thmb box stores, in association with each other, a referrer and a reference as information for associating a master image with a thumbnail image of the master image. In the thmb box, the referrer represents an item ID of a master image, and the reference represents an item ID of a thumbnail image of the master image identified by the item ID of the referrer. Therefore, according to the reference associated with the referrer, the item ID of a thumbnail image of a master image identified by the item ID represented by the referrer can be recognized. Additionally, according to the referrer associated with the reference, the item ID of a master image of a thumbnail image specified by the item ID represented by the reference can be recognized.

As described in FIG. 6, the iprp box stores the ipco box and the ipma box. As described in FIG. 6, the ipco box stores properties of a frame as an item stored in the mdat box such as codec information regarding a codec and image size information regarding size. As described in FIG. 6, the ipma box stores indices of items stored in the mdat box to properties stored in the ipco box.

As described in FIG. 6, the iloc box stores information regarding the storage location of items in the mdat box. In FIG. 9, the iloc box stores that the number of items is four. Furthermore, the iloc box stores the size and offset to the storage place of each of the master images Item #1 and Item #2 and the thumbnail images Item #101 and Item #102 stored in the mdat box in association with the item ID.

<Sequence File>

Figure 10:
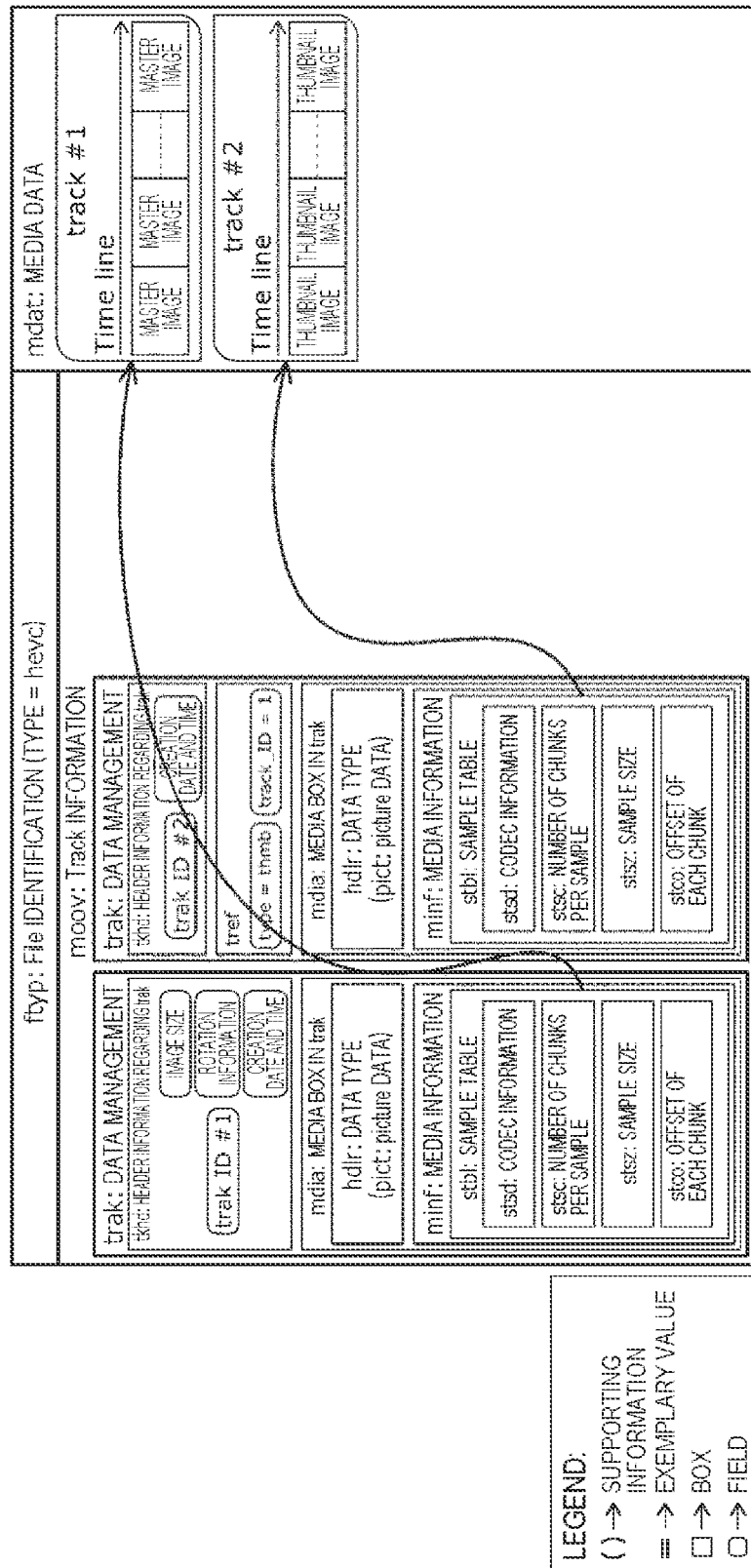
FIG. 10 is a diagram illustrating an example of a sequence file storing a track of a master image and a track of a thumbnail image of the master image.

FIG. 10 is a diagram illustrating an example of a sequence file storing a track of a master image and a track of a thumbnail image of the master image.

Here, assume that a frame is encoded by HEVC and stored in the mdat box of the sequence file.

The ftyp box stores, as identification information for identifying the file format, hevc indicating that the format is the image sequence format and that the codec is HEVC.

As described in FIG. 7, the moov box stores the trak box that manages each track stored in the mdat box. In FIG. 10, the mdat box stores a track (hereinafter also described as track #1) of a master image identified by a track ID #1 and a track #2 of a thumbnail image of the master image of the track #1. Therefore, the moov box stores a trak box that manages the track #1 and a trak box that manages the track #2. (The frame of) the nth thumbnail image (from the top) of the track #2 is a thumbnail image of the nth master image of the track #1.

When continuous shooting is performed by the digital camera 10, for example, the sequence file is useful in a case where master images and thumbnail images of a plurality of frames obtained by the continuous shooting are recorded as one track.

The tkhd box of the trak box that manages the track #1 of the master image stores the track ID #1 that identifies the track #1, an image size of the master image included in the track #1, rotation information indicating the direction of the digital camera 10 when the master image is captured, and a creation date and time of the track #1. The tkhd box of the trak box that manages the track #2 of the thumbnail image stores the track ID #2 that identifies the track #2 and a creation date and time of the track #2.

In addition to the tkhd box and the mdia box described in FIG. 7, the trak box can store a tref box. The tref box stores a track ID for identifying another track associated with the track managed by the trak box in which the tref box is stored, information indicating the content of the track, and the like. In FIG. 10, the tref box is provided in the trak box that manages the track #2. Then, the tref box stores information indicating that another track related to the track #2 is the track #1 (track_ID=1) and that data included in the track #2 is a thumbnail image (that track #2 is track of thumbnail image) (type=thmb).

In addition to the minf box described in FIG. 8, the mdia box of the trak box can store an hdlr box. The hdlr box stores information indicating the type of data included in the track managed by the trak box in which the hdlr box is stored. The hdlr box stored (in mdia box stored) in the trak box that manages the track #1 of the master image stores information (pict) indicating that data included in the track #1 is a picture (frame), and the hdlr box stored in the trak box that manages the track #2 of the thumbnail image stores information indicating that data included in the track #2 is a picture.

The minf box is as described in FIG. 8.

<HEIF File Storing Tile Image>

Figure 11:
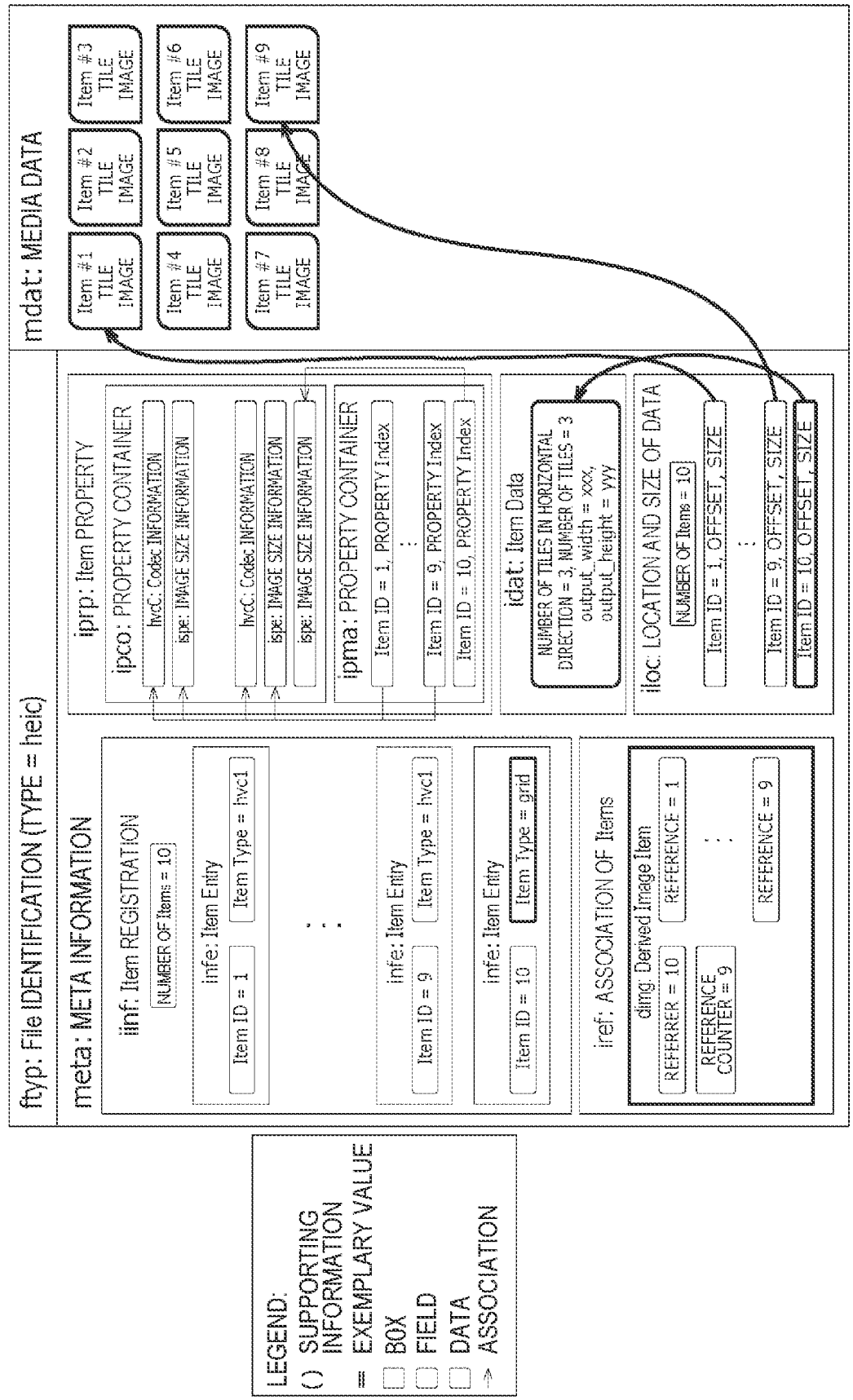
FIG. 11 is a diagram illustrating an example of a HEIF file storing tile images.

FIG. 11 is a diagram illustrating an example of a HEIF file storing tile images.

Here, one item type of HEIF is grid. A grid image whose item type is grid image (item) is formed by tiling one or more tile images.

As a tile image, for example, a divided image obtained by dividing an image captured by the digital camera 10 or the like can be adopted.

Additionally, as a tile image, an image itself captured by the digital camera 10 or the like can be adopted, and a grid image can include one or more of such tile images. For example, a plurality of images captured by a plurality of cameras can be used as tile images, and a grid image can include such a plurality of tile images.

Hereinafter, in order to simplify the description, unless otherwise specified, a divided image obtained by dividing an image captured by the digital camera 10 or the like is adopted as a tile image.

For a grid image whose item type is grid, each of (one or more) tile images forming the grid image is stored in a HEIF file as an item.

Note that for a grid image, the grid image itself is not stored in a HEIF file, but the tile image forming the grid image is stored in a HEIF file. Note, however, that in the present specification, for convenience, a HEIF file storing tile images is also referred to as a HEIF file storing grid images including the tile images.

FIG. 11 illustrates an example of a HEIF file storing (tile images forming) a grid image.

In the HEIF file of FIG. 11, for example, nine images obtained by dividing an image (hereinafter also referred to as captured image) captured by the digital camera 10 into 3×3 (horizontal×vertical) images are stored as tile images Item #1 to Item #9, and the tile images Item #1 to Item #9 are stored as items in the mdat box.

In FIG. 11, while the items stored in the mdat box are nine items of the tile images Item #1 to Item #9, the number of items in the iinf box and the iloc box is 10. This is because a grid image (reconstructed image) including the tile images Item #1 to Item #9 is counted as an item in addition to the nine items of the tile images Item #1 to Item #9. In FIG. 11, the item ID of the grid image is 10, and for convenience of description, the grid image is also referred to as a grid image Item #10.

For the grid image Item #10, media data is not stored in the mdat box, and instead, an idat box is stored in the meta box. The idat box stores metadata of the grid image such as the number of tiles in the horizontal direction, the number of tiles in the vertical direction, output_width, and output_height.

The number of tiles in the horizontal direction and the number of tiles in the vertical direction indicate the numbers of tile images #1 to #9 included in the grid image Item #10 in the horizontal direction and the vertical direction, respectively.

Here, output_width and output_height indicate the horizontal and vertical sizes (number of pixels) of a canvas, which is an image area in which tile images forming a grid image are tiled (arranged). Assuming that the number of pixels in the horizontal and vertical directions of a tile image is represented as tile_width and tile_height, tile_width×the number of tiles in the horizontal direction needs to be output_width or more, and tile_height×the number of tiles in the vertical direction needs to be output_height or more.

Furthermore, for the grid image Item #10, the iloc box stores information (offset and size) regarding the storage location of the grid image Item #10, and this information indicates the storage location of the idat box of the grid image Item #10.

The HEIF file of FIG. 11 includes 10 infe boxes in response to the storage of 10 items of the tile images Item #1 to Item #9 and the tile image Item #10 including the tile images Item #1 to Item #9. As described with reference to FIG. 9, the infe box stores (registers) the item ID identifying the item and the item type. The infe box of the grid image Item #10 stores grid representing a grid item as the item type of the grid image Item #10. An item whose item type is grid, which is the grid image Item #10 in this example, is referred to as a grid item.

In a HEIF file storing a grid item, the iref box stores a dimg box. The dimg box stores information associating a grid item with tile images included in the grid item. For example, the dimg box stores an item ID of a tile image as a reference, and stores an item ID of a grid image including the tile image as a referrer. In FIG. 11, the item IDs #1 to #9 of the tile images Item #1 to Item #9 are stored as references, and the item ID #10 of the grid image Item #10 is stored as a referrer. In addition, the dimg box stores a reference counter indicating the number of tile images included in the grid image.

For the HEIF file as described above, the file control unit 43 can recognize, from the item type grid stored in the infe box of the grid image Item #10, that the grid image Item #10 is a grid item (reconstructed image) including one or more tile images. Furthermore, the file control unit 43 can identify, from the referrer and the reference stored in the dimg box, the item ID #10 of the grid image Item #10 including the tile images and the item IDs #1 to #9 of the tile images Item #1 to Item #9 used to form the grid image Item #10. Additionally, the file control unit 43 can identify, from the number of tiles in the horizontal direction and the number of tiles in the vertical direction, and output_width and output_height stored in the idat box, the number of tile images #1 to #9 in the horizontal direction and the vertical direction included in the grid image #10 and the size in the horizontal direction and the vertical direction of the canvas on which the tile images #1 to #9 are arranged when forming the grid image #10.

The file control unit 43 can form the grid image Item #10 of the item ID #10 identified from the dimg box by arranging the number of tile images in the horizontal direction and the vertical direction identified from the idat box from the tile images Item #1 to Item #9 of the item IDs #1 to #9 identified from the dimg box on the canvas having the size identified from the idat box.

<HEIF File with Restoration Function>

Figure 12:
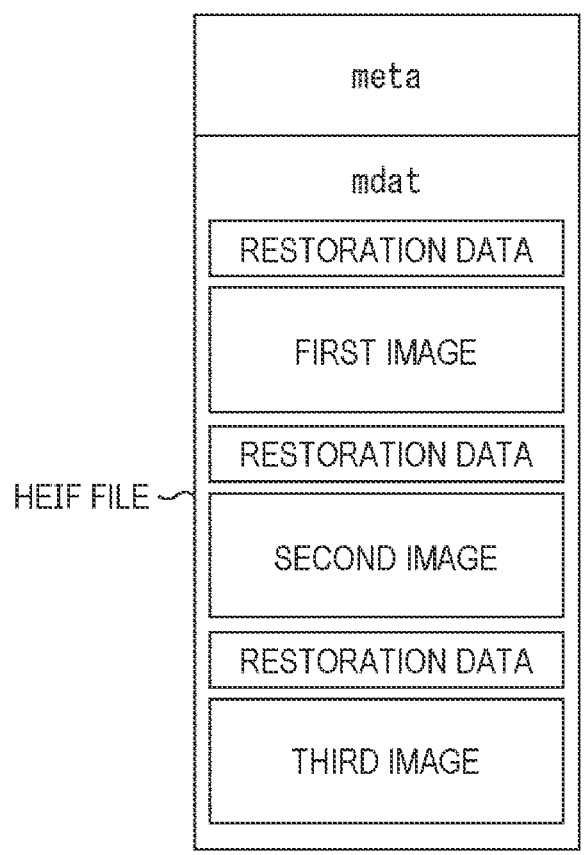
FIG. 12 is a diagram illustrating an outline of a HEIF file with restoration function generated by a file control unit 43.

FIG. 12 is a diagram illustrating an outline of a HEIF file with restoration function generated by the file control unit 43.

A HEIF file can store, for example, images (master images) as a plurality of still images such as images captured by continuous shooting. In a case where a HEIF file stores a plurality of images, the writing time required for writing (recording) the HEIF file into the medium 14 increases as the number of images increases. The plurality of images mentioned here does not mean a plurality of images having the same content such as a master image and a thumbnail image, for example, but means a plurality of images separately captured such as images captured by continuous shooting.

In a case where the writing time is long, there is a high possibility that an abnormal HEIF file, that is, a file that does not have a format as a HEIF file, is generated due to occurrence of an unexpected event during writing of the HEIF file into the medium 14. Here, the unexpected event during the writing into the medium 14 is, for example, removal of the medium 14 by the user, power interruption caused by removal of a battery or removal of a plug, or the like.

An abnormal HEIF file cannot be reproduced, and the user loses all the images to be stored in the HEIF file.

Against this background, the file control unit 43 can generate a HEIF file with restoration function, which is a HEIF file having a function of restoring an abnormal HEIF file to a normal HEIF file, that is, a file having a format as a HEIF file.

A HEIF file with restoration function stores, together with an image, restoration data for restoring the HEIF file, which is used to generate (restore) metadata (hereinafter also referred to as management metadata) stored in the meta box for reproduction, management, and the like of the image.

In FIG. 12, a HEIF file with restoration function storing three images and restoration data of each image, that is, restoration data for generating image management metadata for each of the three images is generated. Additionally, in the HEIF file with restoration function in FIG. 12, the image restoration data is arranged immediately before the image. That is, immediately after restoration data, an image for which management metadata is restored (generated) using the restoration data is arranged.

In a case where an abnormal HEIF file with restoration function is generated due to occurrence of an unexpected event during writing of the HEIF file with restoration function into the medium 14, the file control unit 43 restores the abnormal HEIF file with restoration function to a normal HEIF file (with a restoration function) using restoration data.

That is, the file control unit 43 generates management metadata using restoration data corresponding to a normally written image stored in an abnormal HEIF file with restoration function. Furthermore, the file control unit 43 generates a normal HEIF file in which the management metadata is stored in the meta box.

Therefore, during the writing of the HEIF file with restoration function into the medium 14, in a case where an unexpected event such as removal of the medium 14 or abnormal power interruption caused by removal of a battery or the like occurs, it is possible to reduce the number of images that the user loses.

Figure 13:
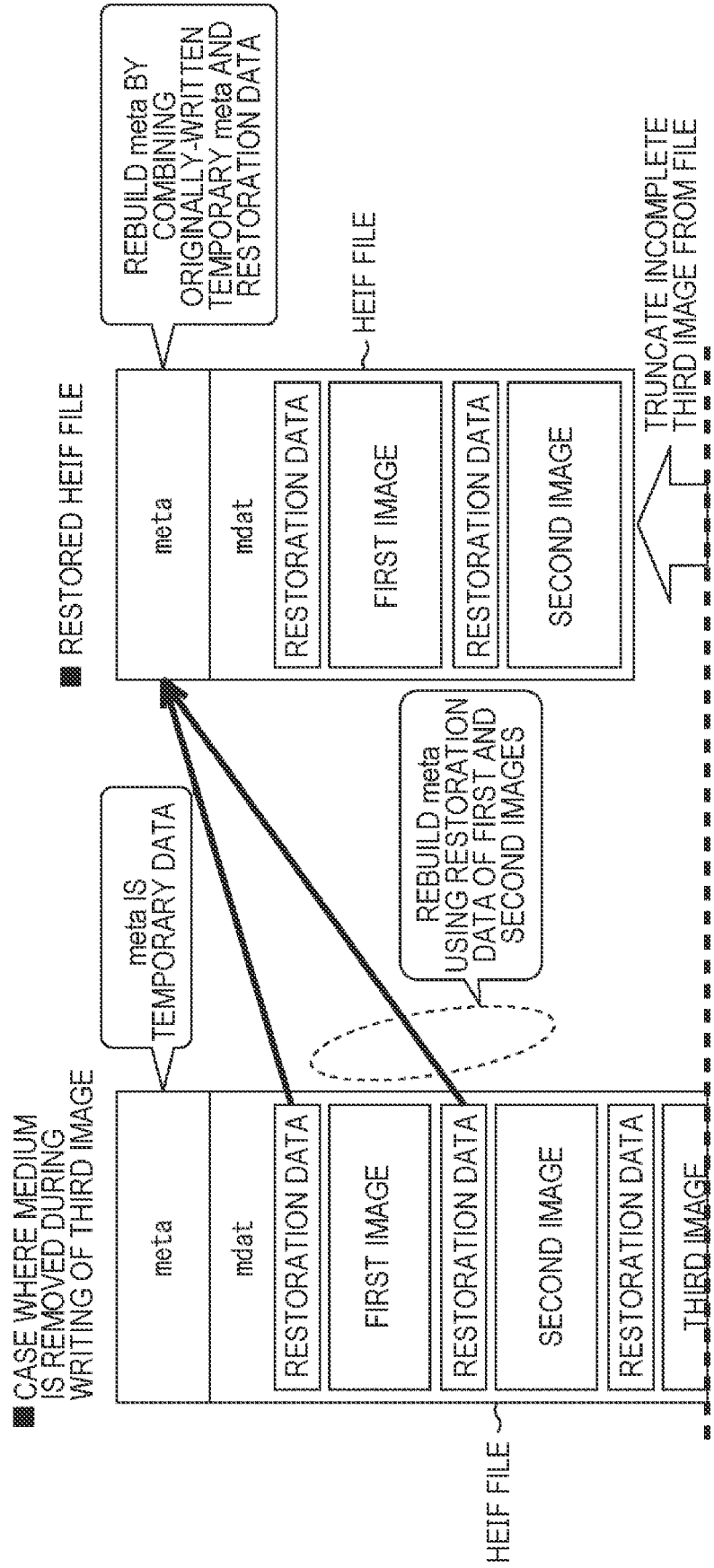
FIG. 13 is a diagram illustrating an outline of restoration of an abnormal HEIF file (with restoration function) using restoration data.

FIG. 13 is a diagram illustrating an outline of restoration of an abnormal HEIF file (with restoration function) using restoration data.

FIG. 13 illustrates an example of restoration of a HEIF file in a case where, after a temporary data meta box is written and then restoration data of a first image, the first image, restoration data of a second image, the second image, and restoration data of a third image are written in the mdat box, an unexpected event such as removal of the medium 14 occurs in the middle of writing of the third image. Here, a temporary data meta box means a fixed-length (fixed-size) meta box in which metadata (hereinafter also referred to as confirmed metadata) confirmed at the time of writing of the meta box is written and in which an area for writing metadata is secured for unconfirmed metadata. The same applies to boxes other than the meta box.

In FIG. 13, an unexpected event occurs in the middle of writing of the third image. Therefore, the HEIF file with restoration function in FIG. 13 is an abnormal HEIF file in which the first and second images and restoration data of the first and second images are normally (completely) written while the third image is not completely written, and the meta box is temporary data.

In the restoration of the abnormal HEIF file as described above, the file control unit 43 deletes (truncates) the third image that has been partially written. Furthermore, the file control unit 43 generates metadata other than confirmed metadata necessary for a normal HEIF file by using the restoration data of the first and second images that has been normally written and the metadata stored in the temporary data meta box, and generates a normal meta box storing the metadata and the confirmed metadata. Then, the file control unit 43 writes the normal meta box instead of the temporary data meta box into the HEIF file, thereby generating a normal HEIF file (restoring the abnormal HEIF file).

Note that while the present specification describes a case where a HEIF file in an image item format is adopted as a HEIF file with restoration function, a HEIF file in an image sequence format can also be adopted as a HEIF file with restoration function. When a HEIF file in the image sequence format is adopted as a HEIF file with restoration function, the meta box storing metadata of data stored in the mdat box is the moov box.

<Generation of HEIF File with Restoration Function>

Figure 14:
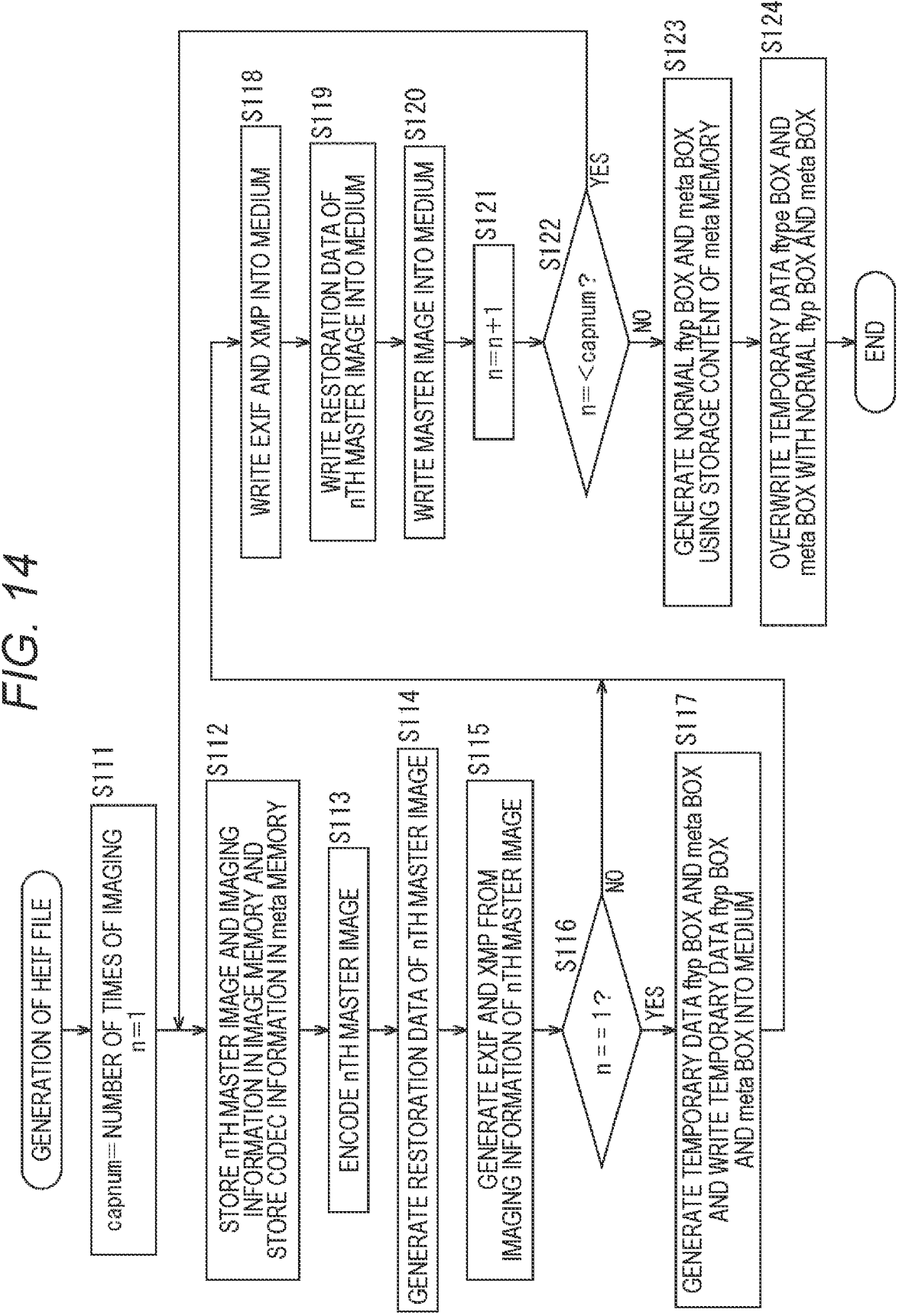
FIG. 14 is a flowchart illustrating an example of processing of generating a HEIF file with restoration function.

FIG. 14 is a flowchart illustrating an example of processing of generating a HEIF file with restoration function.

Note that the digital camera 10 can generate three images which are a master image, a screennail image, and a thumbnail image for one imaging, and generate a HEIF file collectively storing the three images (main image, screennail image, and thumbnail image) and EXIF and XMP as metadata (of imaging) of the three images as image-related data associated with one master image.

Note, however, that in FIG. 14, in order to simplify the description, a HEIF file collectively storing a master image and EXIF and XMP as image-related data associated with one master image is generated.

In step S111, the file control unit 43 sets a variable capnum indicating the number of times of imaging to the number of times of capturing a master image to be stored in one HEIF file (with restoration function). For example, in a case where the user operates a release button (not illustrated) only once to perform imaging once, the variable capnum is set to 1. Additionally, for example, in a case where the user performs continuous shooting, the variable capnum is set to the number of times of imaging performed by the continuous shooting.

Furthermore, in step S111, the file control unit 43 sets a variable n for counting the number of master images to be stored in the HEIF file to 1 as an initial value, and the processing proceeds to step S112.

In step S112, the file control unit 43 stores the nth master image (master image generated by nth imaging) and imaging information in an image memory (not illustrated) and stores codec information in a meta memory (not illustrated), and the processing proceeds to step S113. Here, imaging information is information related to (imaging of) a master image used to generate EXIF and XMP, such as an F value at the time of capturing the master image, a focal length, imaging date and time, and the like. Codec information is information related to a codec of a master image or the like, and is, for example, information such as a sequence parameter set (SPS), a picture parameter set (PPS), or a video parameter set (VPS). Codec information is used to generate a normal meta box.

In step S113, the file control unit 43 causes the encoding control unit 42 to encode the nth master image, and the processing proceeds to step S114.

In step S114, the file control unit 43 generates restoration data of the nth master image, that is, restoration data for restoring metadata (management metadata) of the nth master image, and the processing proceeds to step S115.

In step S115, the file control unit 43 generates EXIF and XMP of the nth master image by using imaging information of the nth master image, and the processing proceeds to step S116.

In step S116, the file control unit 43 determines whether the variable n is 1.

If it is determined in step S116 that the variable n is 1, that is, if it is before image-related data of the first master image is written into the medium 14, the processing proceeds to step S117.

In step S117, the file control unit 43 generates the temporary data ftyp box and meta box. Furthermore, in step S117, the file control unit 43 controls the media control unit 44 to write the temporary data ftyp box and meta box into the medium 14 in such a manner that the ftyp box and the meta box are arranged in this order from the top of the HEIF file, and the processing proceeds to step S118.

In step S118, the file control unit 43 writes the EXIF and XMP of the nth master image into the medium 14 in such a manner that the EXIF and XMP are arranged immediately after the data written into the mdat box of the HEIF file immediately before, and the processing proceeds to step S119. Note that the EXIF and XMP of the first master image are written in such a manner that the EXIF and XMP are arranged from the top of the mdat box immediately after the temporary data ftyp box and meta box written immediately before.

In step S119, the file control unit 43 writes the restoration data of the nth master image into the medium 14 such that the restoration data is arranged immediately after the EXIF and XMP of the nth master image written into the mdat box of the HEIF file immediately before, and the processing proceeds to step S120.

In step S120, the file control unit 43 writes the nth master image into the medium 14 such that the master image is arranged immediately after the restoration data of the nth master image written in the mdat box of the HEIF file immediately before, and the processing proceeds to step S121.

In step S121, the file control unit 43 increments the variable n by 1, and the processing proceeds to step S122.

In step S122, the file control unit 43 determines whether the variable n is less than or equal to capnum of (a variable representing) the number of times of imaging.

If is determined in step S122 that the variable n is less than or equal to the number of times of imaging capnum, that is, if not all of the master images captured by performing imaging for the number of times of imaging capnum have been written into the medium 14, the processing returns to step S112. Thereafter, similar processing is repeated.

Additionally, if it is determined in step S122 that the variable n is not less than or equal to the number of times of imaging capnum, that is, if all of the master images captured by performing imaging for the number of times of imaging capnum have been written into the medium 14, the processing proceeds to step S123.

In step S123, the file control unit 43 generates a normal ftyp box and meta box for the image-related data including the master image normally written in the medium 14 by using the storage content of the meta memory, and the processing proceeds to step S124.

In step S124, the file control unit 43 overwrites the temporary data ftyp box and meta box written in the medium 14 with the normal ftyp box and meta box. As a result, the file control unit 43 generates a HEIF file with restoration function storing (the mdat box including) the normal ftyp box and meta box and the normal image-related data, and ends the processing.

Note that while the HEIF file in FIG. 14 has the master image, EXIF, and XMP as image-related data arranged in the order of EXIF, XMP, and master image, the arrangement order of the master image, EXIF, and XMP is not limited thereto.

Additionally, while the HEIF file in FIG. 14 has the restoration data of the master image arranged immediately before the master image (master image arranged immediately after restoration data of the master image), the arrangement relationship between the master image and the restoration data of the master image is not limited thereto. For example, for restoration data and a master image, EXIF, and XMP as image-related data, the restoration data can be arranged first, and then the master image, EXIF, and XMP as image-related data can be arranged in the order of EXIF, XMP, and master image. Note that in a case where restoration data is arranged immediately before a master image, if the restoration data can be detected, the top of the master image following immediately after the restoration data can be easily detected.

As described above, here, in order to simplify the description, a master image and EXIF and XMP are set as image-related data associated with one master image. Note, however, that as image-related data associated with one master image, a master image and a related image associated with the master image, that is, a screennail image and a thumbnail image having the same content as the master image and having a small number of pixels, and EXIF and XMP which are metadata of the master image and the like can be adopted. In this case, restoration data is generated for each image. That is, restoration data of each of the master image, the screennail image, and the thumbnail image is generated.

Additionally, in this case, as the arrangement order of the image-related data and the restoration data, for example, it is possible to adopt an order of EXIF, restoration data of thumbnail image, thumbnail image, restoration data of master image, master image, restoration data of screennail image, screennail image, and XMP. In addition, for example, it is possible to adopt an arrangement order in which the restoration data of each of the master image, the screennail image, and the thumbnail image is collectively arranged first, and then the image-related data is arranged.

<Restoration of HEIF File with Restoration Function>

Figure 15:
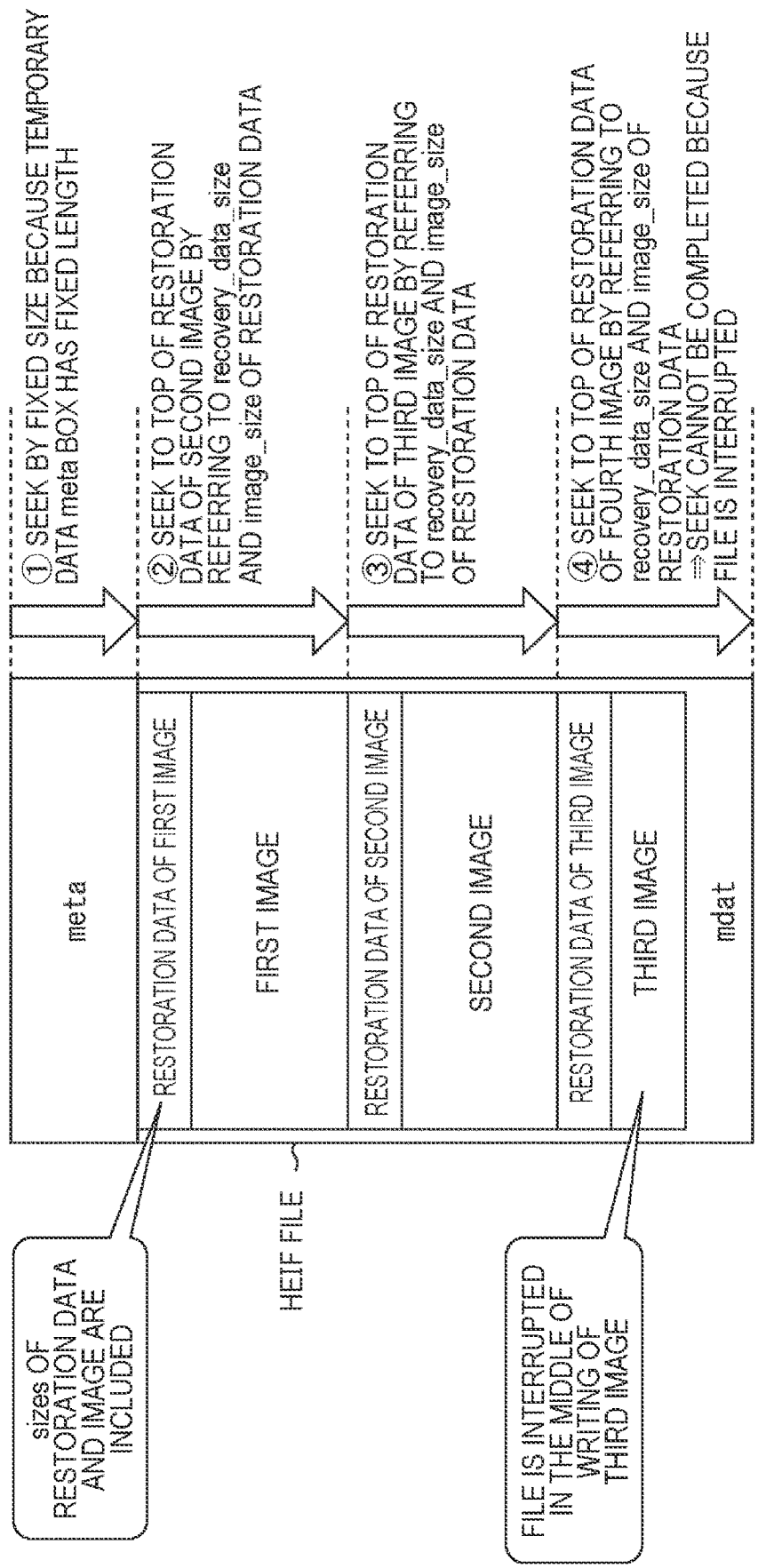
FIG. 15 is a diagram illustrating an example of an abnormal HEIF file with restoration function.

FIG. 15 is a diagram illustrating an example of an abnormal HEIF file with restoration function.

Note that in FIG. 15, in order to simplify the description, only the image and restoration data of the image are arranged in the mdat box in the order of restoration data and image, and the ftyp box is not considered. The same applies to FIGS. 16 to 19 described later.

In FIG. 15, the temporary data meta box is written, and thereafter, the restoration data of the first image, the first image, the restoration data of the second image, the second image, and the restoration data of the third image are written in this order in the mdat box. Then, after the restoration data of the third image, during writing of the third image into the mdat box, an unexpected event such as removal of the medium 14 in which the HEIF file with restoration function is written from the digital camera 10 occurs, so that writing is interrupted in the middle of writing of the third image, and an abnormal HEIF file with restoration function is generated.

When the medium 14 in which the abnormal HEIF file with restoration function is recorded is mounted again to the digital camera 10 and the abnormal HEIF file with restoration function is detected, the digital camera 10 starts restoration processing of restoring the abnormal HEIF file with restoration function.

In the restoration processing, first, an interrupted part where writing is interrupted is detected.

In the detection of the interrupted part, the file control unit 43 seeks by a fixed length which is the size of the temporary data meta box from the top of the meta box of the abnormal HEIF file with restoration function (e.g., sets desired read/write location to file pointer which is variable representing read/write location of file). Since the location after seeking is the top position of the restoration data of the first image, the file control unit 43 reads the restoration data of the first image from the location after seeking.

Note that in the generation of the HEIF file with restoration function, for example, in a case where EXIF is arranged before the restoration data, additional seeking is performed by the size of the EXIF. In this case, the size of the EXIF is assumed to be a fixed length.

Additionally, in the generation of the HEIF file with restoration function, in a case where the restoration data cannot be read because an unexpected event occurs during the writing of the restoration data and normal restoration data is not written, the restoration target is (management metadata) from the image arranged at the top of the mdat box to the image arranged immediately before the restoration data that cannot be read.

In a case where (top part of) the restoration data of the first image can be read, the file control unit 43 uses the restoration data of the first image to recognize the size of the restoration data of the first image and the size of the subsequent first image.

The restoration data has, at the top part thereof, a recovery_data_size field indicating the size of the restoration data and an image_size field indicating the size of the image following the restoration data. The file control unit 43 recognizes the size of the restoration data of the first image and the size of the first image from the recovery_data_size field and the image_size field of the restoration data of the first image.

The file control unit 43 seeks by a size obtained by combining the size of the restoration data of the first image and the size of the first image. Since the location after seeking is the top position of the restoration data of the second image, the file control unit 43 reads the restoration data of the second image from the location after seeking.

Similarly to the restoration data of the first image, the file control unit 43 uses the restoration data of the second image to recognize the size of the restoration data of the second image and the size of the subsequent second image.

The file control unit 43 seeks by a size obtained by combining the size of the restoration data of the second image and the size of the second image. Since the location after seeking is the top position of the restoration data of the third image, the file control unit 43 reads the restoration data of the third image from the location after seeking.

Similarly to the restoration data of the first image, the file control unit 43 uses the restoration data of the third image to recognize the size of the restoration data of the third image and the size of the subsequent third image.

The file control unit 43 seeks by a size obtained by combining the size of the restoration data of the third image and the size of the third image.

In the case of a HEIF file with a normal restoration function, the location after seeking is the top position of the restoration data of a fourth image (or end of HEIF file with restoration function). However, in FIG. 15, since the writing is interrupted in the middle of the third image, it is not possible to seek to the top position of the restoration data of the fourth image, and the seeking fails.

The file control unit 43 detects that (the location of) the third image is the interrupted part where writing is interrupted due to the failure of seeking for the size obtained by combining the size of the restoration data of the third image and the size of the third image.

Figure 16:
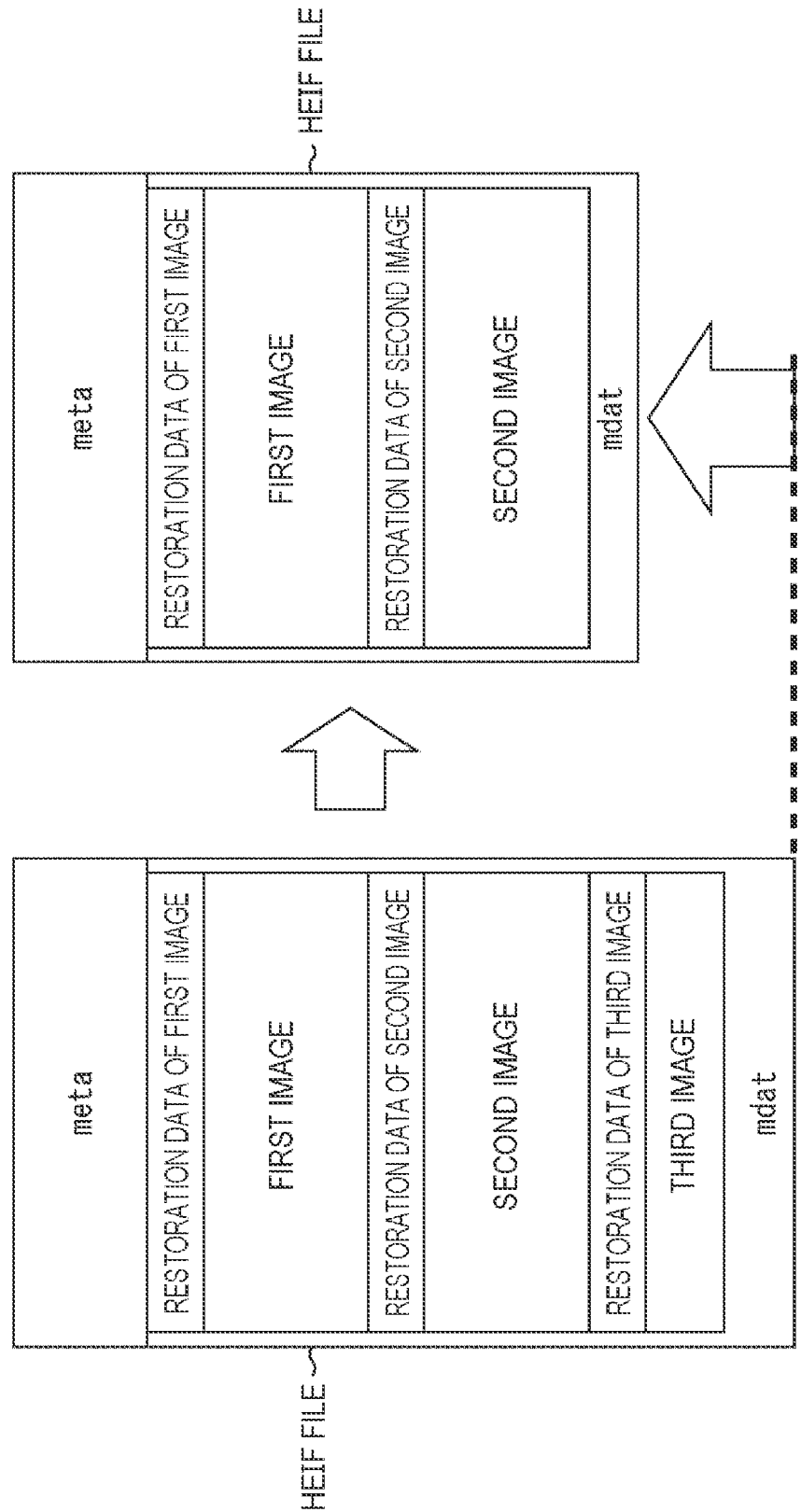
FIG. 16 is a diagram illustrating an example of restoration processing after detection of an interrupted part.

FIG. 16 is a diagram illustrating an example of restoration processing after detection of an interrupted part.

When detecting an interrupted part, the file control unit 43 deletes the image of the interrupted part and the restoration data of the image from the mdat box of the HEIF file with restoration function.

As a result, the mdat box of the HEIF file with restoration function is in a state where only the data that has been normally written is stored, which, in this example, is a state where the first and second images written before the interrupted part and the restoration data of the first and second images are stored.

Note that in a case where the interrupted part is not the third image but, for example, restoration data of the third image before the third image is written, only the restoration data of the third image is deleted.

Additionally, for example, in a case where a master image, a screennail image, a thumbnail image, EXIF, and XMP are adopted as image-related data associated with one master image, and restoration data of each of the master image, the screennail image, and the thumbnail image is written together with the image-related data, when any one of the image-related data and the restoration data is detected as the interrupted part, all of the image-related data and the restoration data including the interrupted part can be deleted. In this case, for example, when the thumbnail image is detected as the interrupted part or the EXIF is detected as the interrupted part, all of the image-related data and the restoration data including the thumbnail image or the EXIF are deleted.

Furthermore, in a case where image-related data and restoration data are arranged in the order of, for example, EXIF, restoration data of a thumbnail image, a thumbnail image, restoration data of a master image, a master image, restoration data of a screennail image, a screennail image, and XMP, for example, when the screennail image is detected as the interrupted part, only the screennail image and the restoration data of the screennail image arranged immediately before the screennail image are deleted, and the EXIF, the restoration data of the thumbnail image, the thumbnail image, the restoration data of the master image, and the master image arranged before the restoration data of the screennail image can be left as they are.

Figure 17:
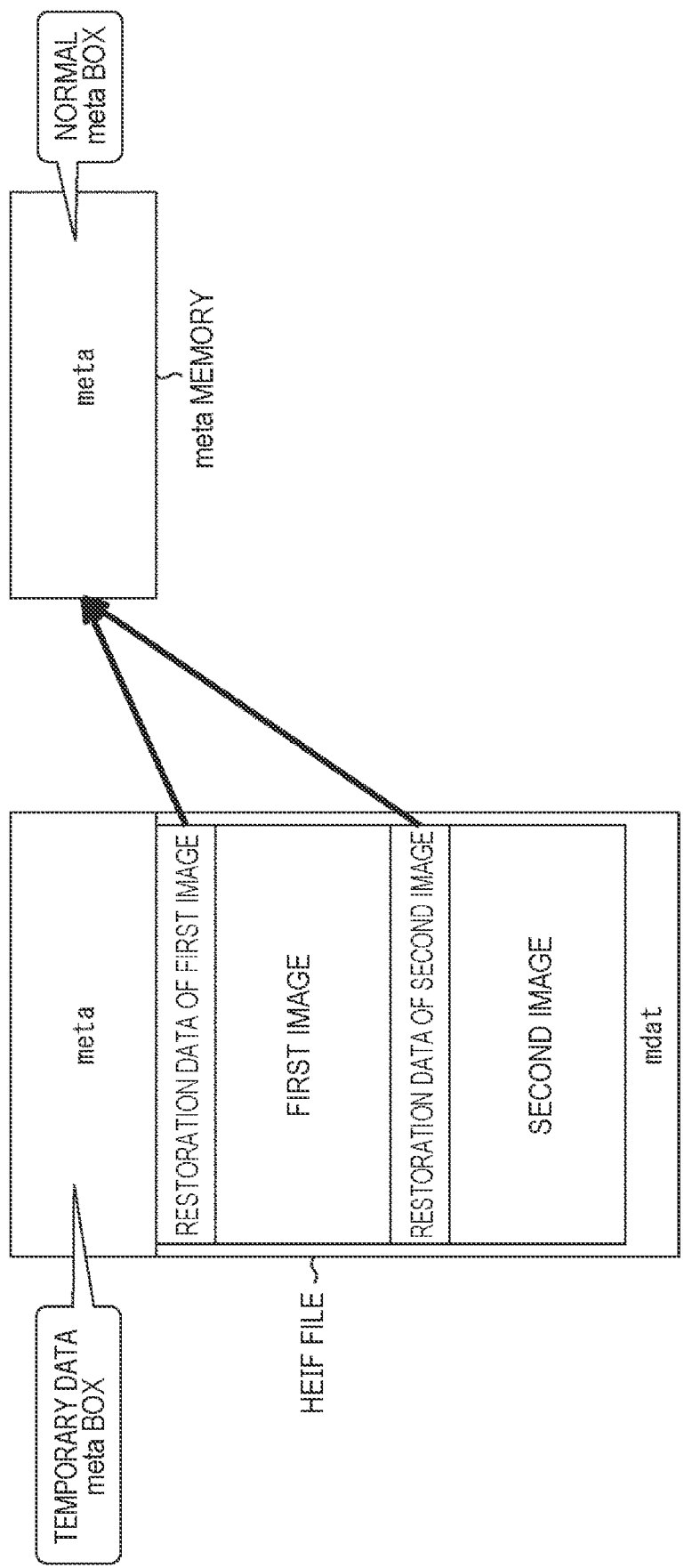
FIG. 17 is a diagram illustrating an example of restoration processing after deletion of an image at an interrupted part and restoration data of the image.

FIG. 17 is a diagram illustrating an example of restoration processing after deletion of an image at an interrupted part and restoration data of the image.

When deleting the image at the interrupted part and the restoration data of the image, the file control unit 43 uses restoration data of images normally written in the HEIF file with restoration function after the deletion to generate (restore) a normal meta box storing management metadata of the images.

That is, the file control unit 43 generates management metadata other than confirmed metadata necessary for a normal HEIF file by using the restoration data of the first and second images that has been normally written and the metadata stored in the temporary data meta box, and generates a normal meta box by writing the management metadata and the confirmed metadata into the meta memory.

Figure 18:
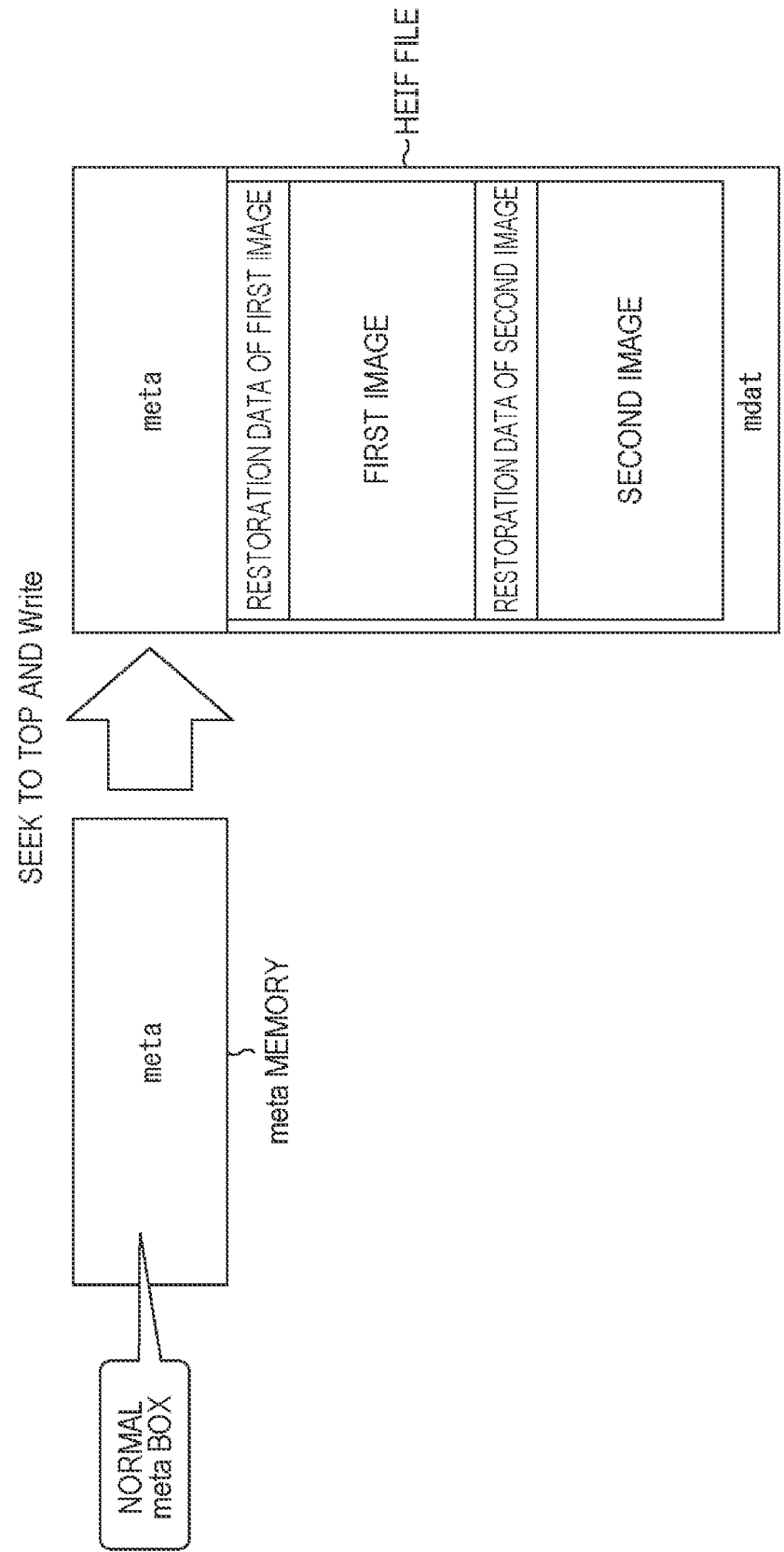
FIG. 18 is a diagram illustrating an example of restoration processing after generation of a normal meta box.

FIG. 18 is a diagram illustrating an example of restoration processing after generation of a normal meta box.

When the normal meta box is generated, the file control unit 43 seeks to the top position of the temporary data meta box of the HEIF file with restoration function, and overwrites with the normal meta box of the meta memory from the location after seeking. As a result, the file control unit 43 generates a normal HEIF file (with a restoration function) (restores an abnormal HEIF file).

Figure 19:
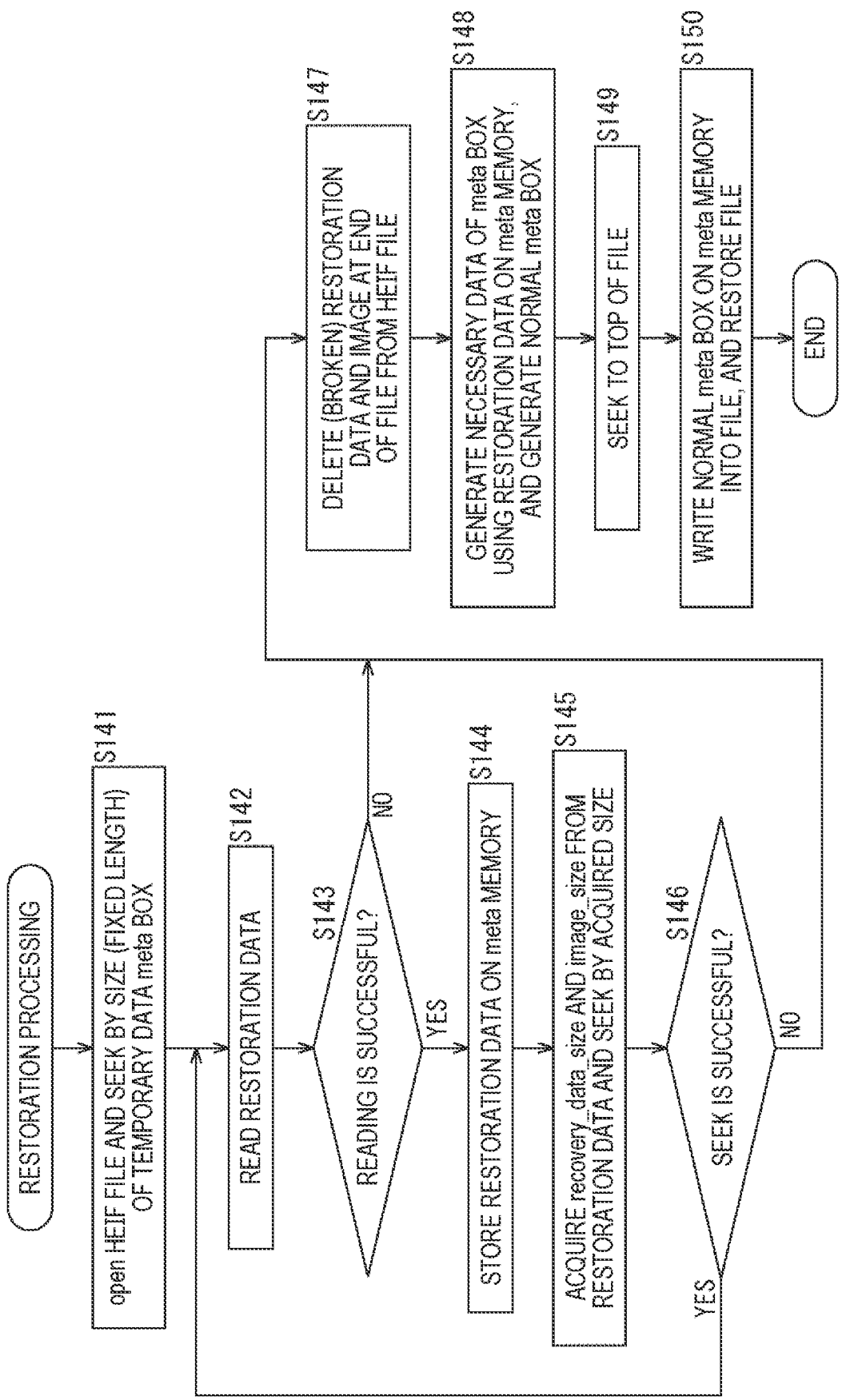
FIG. 19 is a flowchart illustrating an example of restoration processing.

FIG. 19 is a flowchart illustrating an example of restoration processing.

For example, when an abnormal HEIF file with restoration function is detected from HEIF files with restoration function recorded in the medium 14, the file control unit 43 starts restoration processing. Whether or not a HEIF file is a HEIF file with restoration function can be determined, for example, by providing a new field or box indicating that the HEIF file is a HEIF file with restoration function in the meta box, and the determination can be made according to the new field or box.

In the restoration processing, in step S141, the file control unit 43 opens an abnormal HEIF file with restoration function recorded in the medium 14 (e.g., generates file pointer for accessing HEIF file). Furthermore, the file control unit 43 seeks by a fixed length which is the size of the temporary data meta box from the top of the meta box of the opened abnormal HEIF file with restoration function, and the processing proceeds from step S141 to step S142.

In step S142, the file control unit 43 reads restoration data from the location after seeking, that is, the top position of the restoration data, and the processing proceeds to step S143.

Here, in the restoration data, a recovery_data_size field indicating the size of the restoration data is arranged in a fixed location, such as at the top part of the restoration data. In reading the restoration data, the size of the restoration data can be recognized from the recovery_data_size field.

In step S143, the file control unit 43 determines whether the restoration data has been successfully read.

If it is determined in step S143 that the reading of the restoration data has not succeeded, that is, if the restoration data cannot be read because an unexpected event has occurred during the writing of the restoration data, the restoration data is not written normally (completely), and an abnormal restoration data is written, the file control unit 43 detects the location of the abnormal restoration data as an interrupted part where the writing has been interrupted, and the processing proceeds to step S147.

Additionally, if it is determined in step S143 that the reading of the restoration data is successful, the processing proceeds to step S144.

In step S144, the file control unit 43 stores the restoration data (hereinafter also referred to as latest restoration data) read in the immediately preceding step S142 in the meta memory, and the processing proceeds to step S145.

In step S145, the file control unit 43 acquires the recovery_data_size field and the image_size field from the latest restoration data stored in the meta memory. Further, the file control unit 43 recognizes the size of the latest restoration data and the size of an image arranged immediately after the latest restoration data in the abnormal HEIF file with restoration function from recovery_data_size and image_size. Then, the file control unit 43 seeks by a size obtained by combining the size of the latest restoration data (from top of latest restoration data of HEIF file with restoration function) and the size of the image arranged immediately after the latest restoration data, and the processing proceeds from step S145 to step S146.

In step S146, the file control unit 43 determines whether the seek performed in the immediately preceding step S145 is successful.

If it is determined in step S146 that the seek is successful, that is, if the top of the restoration data arranged immediately after the image arranged immediately after the latest restoration data is reached by the seek, the processing returns to step 3142. In step 3142, as described above, the file control unit 43 reads restoration data from the location after seeking, that is, the top position of the restoration data, and thereafter, similar processing is repeated.

On the other hand, if it is determined in step S146 that the seek has failed, that is, if an unexpected event occurs during the writing of the image arranged immediately after the latest restoration data and the writing of the image is interrupted, the file control unit 43 detects the location of the image for which the writing has been interrupted and which has failed in the seek as the interrupted part, and the processing proceeds to step S147.

In step S147, the file control unit 43 deletes the image and restoration data of the interrupted part from the HEIF file with restoration function, and the processing proceeds to step S148.

That is, in step S147, if the interrupted part is the location of restoration data, the restoration data is deleted. Additionally, if the interrupted part is the location of an image, the image and restoration data arranged immediately before the image are deleted.

In step S148, the file control unit 43 generates management metadata other than confirmed metadata necessary for a normal HEIF file by using restoration data stored in the meta memory, that is, restoration data normally written in the HEIF file with restoration function and necessary management metadata stored in the temporary data meta box, and generates a normal meta box by writing the management metadata and the confirmed metadata in the meta memory.

Thereafter, the processing proceeds from step S148 to step S149, the file control unit 43 seeks to the top position of the temporary data meta box of the HEIF file with restoration function, and the processing proceeds to step S150. In step S150, the file control unit 43 restores the HEIF file with restoration function by overwriting the normal meta box in the meta memory from the location after seeking (generates HEIF file with normal restoration function), and ends the restoration processing.

Example of Restoration Data

FIG. 20 is a diagram illustrating a specific example of restoration data.

For example, as illustrated in FIG. 20, restoration data is configured by arranging fields recovery_data_size, image_size, next_image_exist, info_type, target_size_x, target_size_y, num_of_grid_x, num_of_grid_y, grid_width, grid_height, grid_list, capture_gamma, colormetory, and hvcc_info in this order.

The recovery_data_size field indicates the size (data amount) of the restoration data having the recovery_data_size field in byte units.

The image_size field indicates the size (data amount) of the image to be arranged immediately after the restoration data having the recovery_data_size field in byte units.

The next_image_exist field indicates whether the next image (and restoration data of the image) exists after the image arranged immediately after the restoration data having the recovery_data_size field. In a case where the next image exists, the next_image_exist field is set to one of 0 and 1, such as 1, and in a case where the next image does not exist, the next_image_exist field is set to the other, which is 0.

The info_type field indicates the picture type (INFO type) of the image to be arranged immediately after the restoration data having the recovery_data_size field.

The target_size_x field and the target_size_y field respectively indicate the vertical and horizontal sizes (number of pixels) of the image arranged immediately after the restoration data having the target_size_x field and the target_size_y field.

In a case where an image arranged immediately after the restoration data having the num_of_grid_x field and the num_of_grid_y field is (a tile image forming) a grid image which is a grid item, the num_of_grid_x field and the num_of_grid_y field respectively indicate the number of divisions in the vertical direction and in the horizontal direction of the grid image, that is, the number of tile images in the vertical direction and in the horizontal direction included in the grid image.

In a case where an image arranged immediately after the restoration data having the grid_width field and the grid_height field is a grid image, the grid_width field and the grid_height field respectively indicate the vertical and horizontal sizes (number of pixels) of the tile images included in the grid image.

The grid_list field indicates grid information to be described later regarding an image arranged immediately after the restoration data having the grid_list field.

The capture_gamma field indicates gamma information regarding gamma of an image arranged immediately after the restoration data having the capture_gamma field.

The colormetory field indicates colorimetry information regarding the colorimetry of an image arranged immediately after the restoration data having the colormetory field.

The hvcc_info field is hvcc information regarding an image arranged immediately after the restoration data having the hvcc_info field, and indicates hvcc information not including SPS, PPS, VPS, or the like.

FIG. 21 is a diagram illustrating a specific example of a grid_list field as grid information in restoration data.

For example, as illustrated in FIG. 21, the grid_list field is configured by arranging fields param_addr, param_size, data_addr, data_size, total_vps_size, num_vps, vps_id, total_sps_size, num_sps, sps_id, total_pps_size, num_pps, and pps_id in this order.

The param_addr field and the param_size field respectively indicate the address and size (data amount) of VPS, SPS, and PPS as parameters regarding the image.

The data_addr field and the data_size field respectively indicate the address and size (data amount) of an elementary stream (ES) related to the image.

The total_vps_size field, the num_vps field, and the vps_id field respectively indicate the size (data amount), number, and ID (ID of network abstraction layer (NAL) unit) of the VPS.

The total_sps_size field, the num_sps field, and the sps_id field respectively indicate the size (data amount), number, and ID (ID of NAL unit) of the SPS.

The total_pps_size field, the num_pps field, and the pps_id field respectively indicate the size (data amount), number, and ID (ID of NAL unit) of the PPS.

While the number of VPS, SPS, and PPS is one in the HEIF file in the image item format, the number of VPS, SPS, and PPS may be plural in a HEIF file in the image sequence format.

Figure 22:
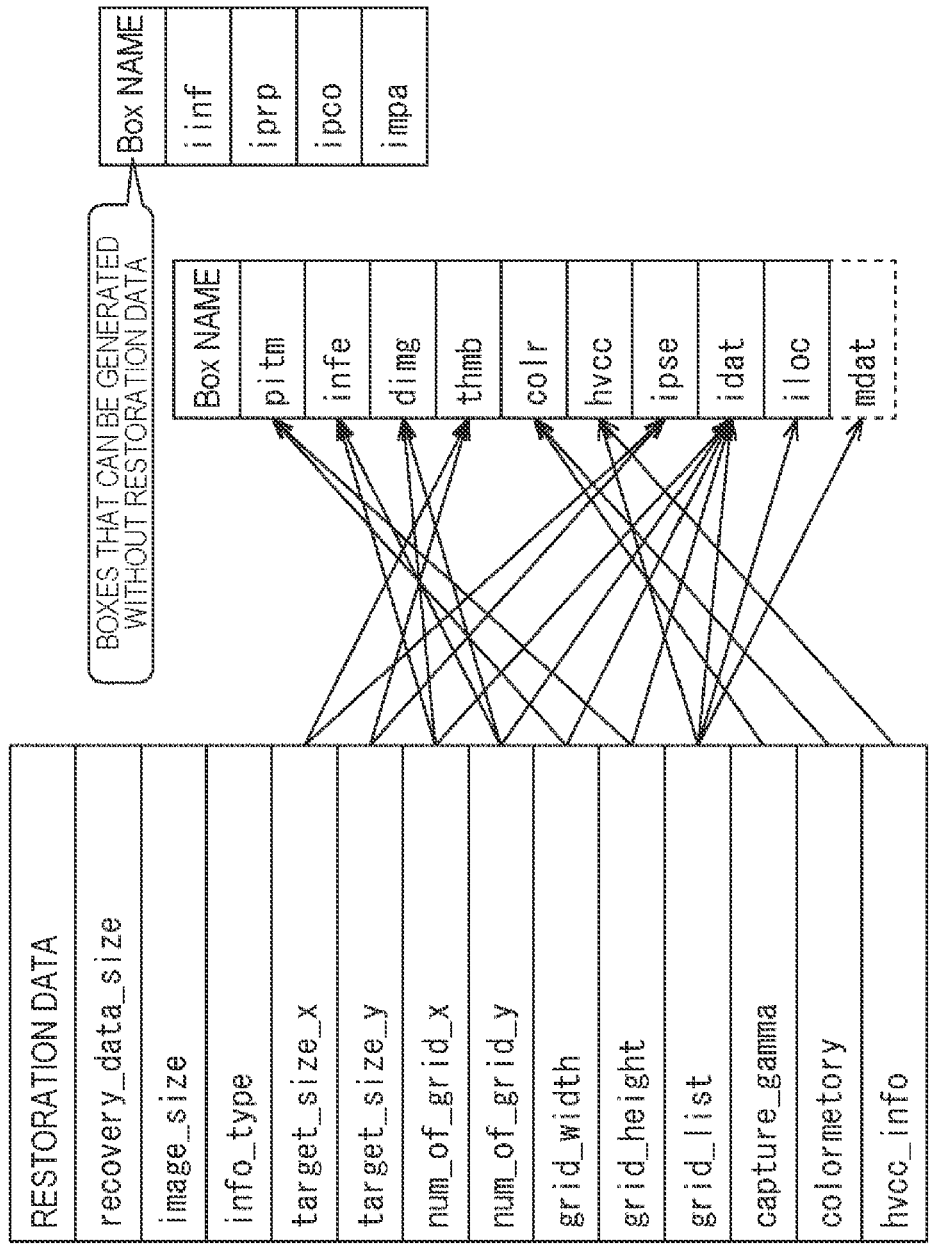
FIG. 22 is a diagram illustrating boxes storing metadata generated (restored) using at least restoration data in the restoration processing.

FIG. 22 is a diagram illustrating boxes storing metadata generated (restored) using at least restoration data in the restoration processing.

Here, the generation (restoration) of management metadata using (the field of) restoration data is also expressed as generation (restoration) of a box storing the management data.

Examples of the boxes stored in the meta box that can be generated by using restoration data include a pitm box, the infe box, the dimg box, the thmb box, a colr box, an hvcc box, an ipse box, the idat box, and the iloc box.

Note that among the boxes stored in the meta box, the iinf box, the iprp box, the ipco box, and an impa box are boxes storing confirmed metadata, or boxes storing management metadata that can be generated from other boxes, and can be generated without restoration data.

(Management metadata stored in) the pitm box can be generated using the grid_width field and the grid_height field.

The infe box and the dimg box can be generated using the num_of_grid_x field and the num_of_grid_y field.

The thum box can be generated using the target_size_x field and the target_size_y field.

The colr box can be generated using the capture_gamma field and the colormetory field.

The hvcc box can be generated using the grid_list field and the hvcc_info field.

The ipse box can be generated using the target_size_x field and the target_size_y field.

The idat box can be generated using the num_of_grid_x field, the num_of_grid_y field, the grid_width field, the grid_height field, and the grid_list field.

The iloc box can be generated using the grid_list field.

Note that although the mdat box is not a box stored in the meta box, the size (data amount) of data after deletion of restoration data at an interrupted part or the size (data amount) of data after deletion of an image at an interrupted part and restoration data of the image in the mdat box can be generated using the grid_list field.

FIG. 23 is a diagram illustrating methods of generating (restoring) boxes that store management metadata generated using at least restoration data in the restoration processing.

Note that FIG. 23 also illustrates methods of generating boxes included in a HEIF file with restoration function other than the boxes generated using restoration data in the restoration processing.

Additionally, in FIG. 23, a related field indicates a field of restoration data used to generate (management metadata stored in) the box.

Furthermore, in FIG. 23, a master image, a screennail image, a thumbnail image, EXIF, and XMP are adopted as image-related data associated with one master image, and the order of EXIF, restoration data of a thumbnail image, a thumbnail image, restoration data of a master image, a master image, restoration data of a screennail image, a screennail image, and XMP is adopted as the arrangement order of image-related data and restoration data in the mdat box.

A HEIF file with restoration function has the ftyp box, the meta box, and the mdat box.

The meta box may store the hdlr box, the pitm box, the iinf box, the iref box, the iprp box, the idat box, and the iloc box.

The iinf box may store the infe box.

The iref box may store the dimg box, the thum box, and a cdsc box.

The iprp box may store the ipco box and the ipma box. The ipco box that may be stored in the iprp box may store the colr box, the hvcc box, an ispe box, and an irot box.

The ftyp box can be generated using a (predetermined) fixed value.

The meta box can be generated by obtaining the size (data amount) of each box stored in the meta box and using the size.

The hdlr box can be generated using a fixed value.

In a case where an image arranged immediately after the restoration data is not a grid image, the pitm box can be generated by setting an item ID of a main item to 1 and using the item ID of the main item. Additionally, in a case where the image arranged immediately after the restoration data is (tile image included in) a grid image, the pitm box can be generated by obtaining the item ID of the main item according to an expression num_of_grid_x×num_of_grid_y+1 using the num_of_grid_x field and the num_of_grid_y field of the restoration data, and using the item ID of the main item.

The iinf box can be generated by obtaining the size (data amount) of each box stored in iprp and the number (total number) of the infe boxes and using the size and the number. Note that the iinf box stores the number of items stored in the mdat box, and the number of items is counted as follows for the image-related data. In a case where, for example, a master image, EXIF, and XMP are adopted as image-related data associated with one master image, the number of items for one piece of image-related data is three which are a master image, EXIF, and XMP. Additionally, in a case where, for example, a master image, a screennail image, a thumbnail image, EXIF, and XMP are adopted as image-related data associated with one master image, the number of items for one piece of image-related data is five which are a master image, a screennail image, a thumbnail image, EXIF, and XMP. For example, in a case where a master image, a screennail image, a thumbnail image, EXIF, and XMP are adopted as image-related data associated with one master image, and the mdat box stores image-related data of two master images, the number of items stored in the iinf box is 10 (=5×2).

The infe box can be generated by using the num_of_grid_x field and the num_of_grid_y field of the restoration data to obtain the number of tile images (number of components of grid) num_of_grid_x×num_of_grid_y included in the grid image, and using an addition value obtained by adding, to the number of tile images num_of_grid_x×num_of_grid_y, the number of components other than the master image among the master image, the screennail image, the thumbnail image, the EXIF, and the XMP as image-related data associated with one master image, that is, four which is the number indicating the screennail image (SCN), the thumbnail image (thumb), the EXIF, and the XMP.

The iref box can be generated by obtaining the size (data amount) of each box stored in iref and using the size.

The dimg box can be generated by using the num_of_grid_x field and the num_of_grid_y field of the restoration data to obtain the number of tile images (number of components of grid) num_of_grid_x×num_of_grid_y included in the grid image and using the number num_of_grid_x×num_of_grid_y.

The thmb box can be generated by using, for each of the screennail image (SCN) and the thumbnail image (thumb), the target_size_x field and the taget_size_y field of the restoration data to obtain the item ID of an item (image) in which target_size_x and taget_size_y are the size (number of pixels) of the screennail image or the thumbnail image as the item ID of the screennail image or the thumbnail image, and using the item ID.

Here, since the arrangement order of the image-related data and the restoration data is determined, the cdsc box can be generated by obtaining the item IDs of EXIF and XMP on the basis of the item ID of the item (image) having the size (number of pixels) of the thumbnail image in the image-related data, and using the item IDs of the EXIF and the XMP.

The iprp box can be generated by obtaining the size of each box stored in the iprp box and using the size.

The ipco box can be generated by obtaining the size of each box stored in the ipco box and using the size.

The colr box can be generated using the capture_gamma field and the colormetory field of the restoration data.

The hvcc box can be generated using the hvcc_info field and the grid_list field of the restoration data.

The ispe box can be generated using the target_size_x field and the taget_size_y field of the restoration data.

The irot box can be generated using a fixed value.

The ipma box can be generated by fixing the order of the infe boxes of each item in a predetermined order so that the infe box of each item can be associated with each property in the ipco, for example, and using the infe box and each property in the ipco box associated with the infe box.

Here, by fixing the order of the infe boxes of each item, the infe box can be associated with the property of an item corresponding to the infe box in the ipco.

For example, assume that the order of the infe boxes is fixed in the order of (infe box of) a master image as an item with an item ID of 1, a screennail image as an item with an item ID of 2, a thumbnail image as an item with an item ID of 3, EXIF, and XMP.

Additionally, assume that the ipco box stores, in this order as properties, information common to the master image, the screennail image, and the thumbnail image, codec information of the master image, image size information of the master image, codec information of the screennail image, image size information of the screennail image, codec information of the thumbnail image, and image size information of the thumbnail image.

In this case, the properties of the master image having the item ID of 1 is the first, second, and third properties in the ipco box. The properties of the screennail image having the item ID of 2 is the first, fourth, and fifth properties in the ipco box. The properties of the thumbnail image having the item ID of 3 are the first, sixth, and seventh properties in the ipco box.

Therefore, the infe box can be associated with properties of the item corresponding to the infe box.

Then, the ipma box storing indices to properties of each item in the ipco box can be generated using the infe box and properties associated with the infe box (properties of item corresponding to infe box).

Note that the HEIF standard specification describes that
  the type and ID of an item are described in the infe box,
  the codec information (hvcc) and the image size (ipse) information is in the ipco box, and
  what are the properties associated with an ID is specified in the ipma box.

The idat box can be generated using the grid_list field, the grid_width field, the grid_height field, the num_of_grid_x field, and the num_of_gird_y field of the restoration data.

The iloc box can be generated using the grid_list field of the restoration data.

Note that, as described in FIG. 22, the size of the data (actually used) in the mdat box can be generated using the grid_list field.

<Description of Computer to which Present Technology is Applied>

Next, the above-described series of processing can be performed by hardware or software. In a case where the series of processing is performed by software, a program that is included in the software is installed on a general-purpose computer or the like.

Figure 24:
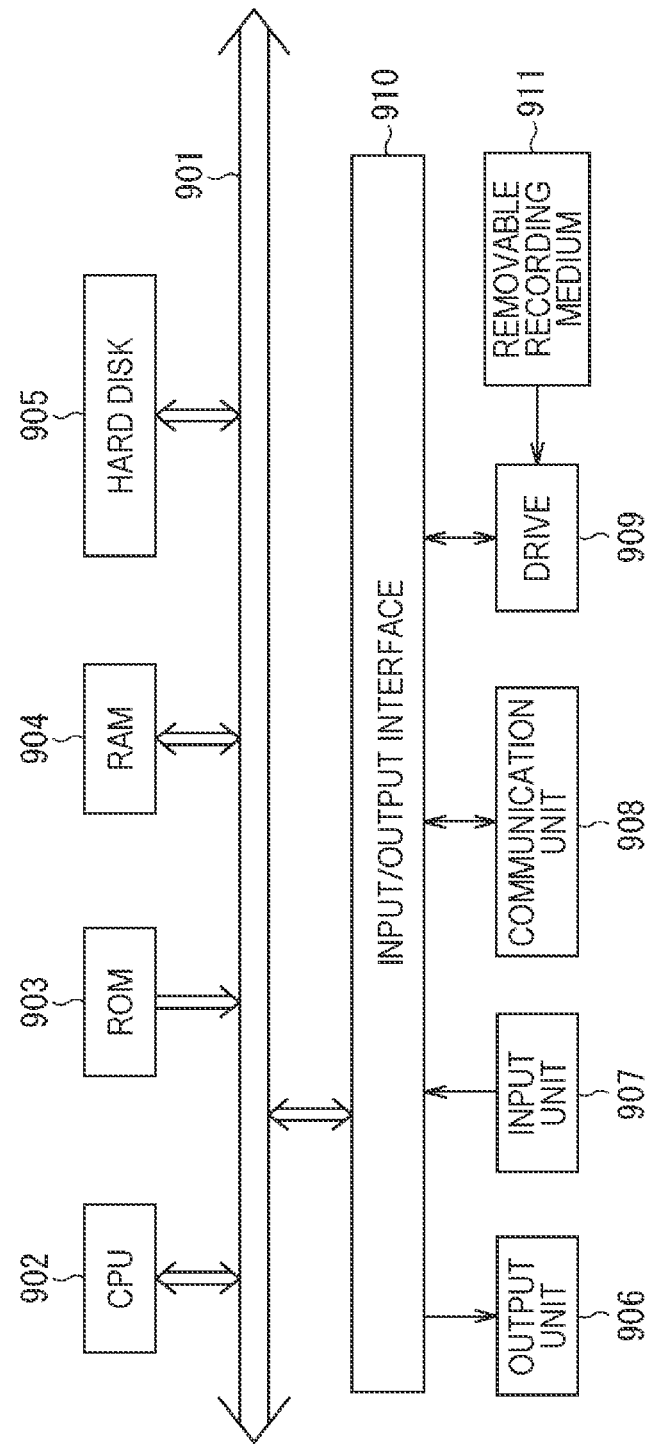
FIG. 24 is a block diagram illustrating a configuration example of one embodiment of a computer to which the present technology is applied.

FIG. 24 is a block diagram illustrating a configuration example of one embodiment of a computer on which a program for executing the above-described series of processing is installed.

The program can be recorded in advance in a hard disk 905 or a ROM 903 as a recording medium built in the computer.

Alternatively, the program can be stored (recorded) in a removable recording medium 911 driven by a drive 909. Such a removable recording medium 911 can be provided as so-called package software. Here, examples of the removable recording medium 911 include a flexible disk, a compact disc read only memory (CD-ROM), a magneto optical (MO) disk, a digital versatile disc (DVD), a magnetic disk, a semiconductor memory, and the like.

Note that the program can be installed on the computer from the removable recording medium 911 as described above, or can be downloaded to the computer through a communication network or a broadcast network and installed in the built-in hard disk 905. That is, for example, the program can be wirelessly transferred from a download site to the computer through an artificial satellite for digital satellite broadcasting, or can be transferred by wire to the computer through a network such as a local area network (LAN) or the Internet.

The computer incorporates a central processing unit (CPU) 902, and an input/output interface 910 is connected to the CPU 902 through a bus 901.

When a command is input by a user operating an input unit 907 or the like through the input/output interface 910, the CPU 902 executes a program stored in the read only memory (ROM) 903 according to the command. Alternatively, the CPU 902 loads the program stored in the hard disk 905 into a random access memory (RAM) 904 and executes the program.

As a result, the CPU 902 performs the processing according to the above-described flowchart or the processing performed by the configuration of the block diagram described above. Then, the CPU 902 performs control to output the processing result from an output unit 906 or transmit the processing result from a communication unit 908 through the input/output interface 910, for example, or record the processing result in the hard disk 905, for example, as needed.

Note that the input unit 907 includes a keyboard, a mouse, a microphone, and the like. Additionally, the output unit 906 includes a liquid crystal display (LCD), a speaker, and the like.

Here, in the present specification, the processing performed by the computer according to the program is not necessarily performed in time series in the order described in the flowchart. That is, the processing performed by the computer according to the program also includes processing executed in parallel or individually (e.g., parallel processing or processing by object).

Additionally, the program may be processed by one computer (processor) or may be processed in a distributed manner by a plurality of computers. Furthermore, the program may be transferred to a remote computer to be executed.

Furthermore, in the present specification, a system means a set of a plurality of components (devices, modules (parts), and the like), and it does not matter whether or not all the components are in the same housing. Therefore, a plurality of devices accommodated in separate housings and connected through a network, and one device accommodating a plurality of modules in one housing are both systems.

Note that the embodiment of the present technology is not limited to the above-described embodiment, and various modifications can be made without departing from the scope of the present technology.

For example, the present technology can have a cloud computing configuration in which one function is shared and processed by a plurality of devices through a network.

Additionally, each step described in the above-described flowchart can be executed by one device or be executed in a shared manner by a plurality of devices.

Furthermore, in a case where a plurality of processing is included in one step, the plurality of processing included in one step can be performed by one device or be performed in a shared manner by a plurality of devices.

Additionally, the effect described in the present specification is merely an illustration and is not restrictive. Hence, other effects can be obtained.

Note that the present technology can also be configured in the following manner.

<1>
A file processing device including
a file control unit that writes restoration data for restoring a high efficiency image file format (HEIF) file storing a still image into the HEIF file.
<2>
The file processing device according to <1>, in which
the restoration data includes data for restoring management metadata for managing the image in the HEIF file.
<3>
The file processing device according to <2>, in which
the file control unit arranges the restoration data for restoring the management metadata of the image immediately before the image.
<4>
The file processing device according to <3>, in which
the restoration data includes a size of the restoration data and a size of the image arranged immediately after the restoration data.
<5>
The file processing device according to any one of <2> to <4>, in which
the restoration data includes data for restoring the management metadata stored in a pitm box, an infe box, a dimg box, a thmb box, a colr box, an hvcc box, an ipse box, an idat box, and an iloc box stored in a meta box of the HEIF file.
<6>
The file processing device according to any one of <1> to <5>, in which
the HEIF file stores the image and a related image associated with the image, and
the file control unit writes restoration data of the image and restoration data of the related image.
<7>
The file processing device according to <6>, in which
the related image includes an image of which a number of pixels is smaller than a number of pixels of the image.
<8>
The file processing device according to any one of <1> to <7>, in which
the HEIF file stores the image and metadata of the image.
<9>
A file processing method including
writing restoration data for restoring a high efficiency image file format (HEIF) file storing a still image into the HEIF file.
<10>
A program for causing a computer to function as
a file control unit that writes restoration data for restoring a high efficiency image file format (HEIF) file storing a still image into the HEIF file.
<11>
A file processing device including
a file control unit that uses restoration data for restoring a high efficiency image file format (HEIF) file storing a still image to restore the HEIF file into which the restoration data is written.
<12>
The file processing device according to <11>, in which
the restoration data includes data for restoring management metadata for managing the image in the HEIF file, and
the file control unit generates the management metadata by using the restoration data.
<13>
The file processing device according to <12>, in which
the file control unit deletes the image at an interrupted part where writing is interrupted from the HEIF file, and uses the restoration data to generate the HEIF file storing the image written before the interrupted part.
<14>
The file processing device according to <13>, in which
the restoration data for restoring the management metadata of the image is arranged immediately before the image, the restoration data includes a size of the restoration data and a size of the image arranged immediately after the restoration data, and the file control unit detects the image as the interrupted part in a case where a seek for a size obtained by combining a size of the restoration data and a size of the image arranged immediately after the restoration data from a top of the restoration data fails.

<15>
The file processing device according to <13> or <14>, in which the HEIF file stores the image and a related image associated with the image, and the file control unit deletes the image and the related image in a case where any one of the image and the related image is detected as the interrupted part.

<16>
The file processing device according to <15>, in which the related image includes an image of which a number of pixels is smaller than a number of pixels of the image.

<17>
The file processing device according to any one of <13> to <16>, in which the HEIF file stores the image and metadata of the image, and the file control unit deletes the image and the metadata in a case where any one of the image and the metadata is detected as the interrupted part.

<18>
The file processing device according to any one of <12> to <17>, in which the file control unit uses the restoration data to restore the management metadata stored in a pitm box, an infe box, a dimg box, a thmb box, a colr box, an hvcc box, an ipse box, an idat box, and an iloc box stored in a meta box of the HEIF file.

<19>
A file processing method including using restoration data for restoring a high efficiency image file format (HEIF) file storing a still image to restore the HEIF file into which the restoration data is written.

<20>
A program for causing a computer to function as a file control unit that uses restoration data for restoring a high efficiency image file format (HEIF) file storing a still image to restore the HEIF file into which the restoration data is written.

REFERENCE SIGNS LIST

10 Digital camera
11 Optical system
13 Signal processing unit
14 Media
15, 16 I/F
17 Button/key
18 Touch panel
19 Liquid crystal panel
20 View finder
21 I/F
41 Optical system/image sensor control unit
42 Encoding control unit
43 File control unit
44 Media control unit
45 Operation control unit
46 Display control unit
47 UI control unit 901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. A file processing device comprising
a file control unit that writes restoration data for restoring a high efficiency image file format (HEIF) file storing a still image into the HEIF file.

2. The file processing device according to claim 1, wherein
the restoration data includes data for restoring management metadata for managing the image in the HEIF file.

3. The file processing device according to claim 2, wherein
the file control unit arranges the restoration data for restoring the management metadata of the image immediately before the image.

4. The file processing device according to claim 3, wherein
the restoration data includes a size of the restoration data and a size of the image arranged immediately after the restoration data.

5. The file processing device according to claim 2, wherein
the restoration data includes data for restoring the management metadata stored in a pitm box, an infe box, a dimg box, a thmb box, a colr box, an hvcc box, an ipse box, an idat box, and an iloc box stored in a meta box of the HEIF file.

6. The file processing device according to claim 1, wherein
the HEIF file stores the image and a related image associated with the image, and
the file control unit writes restoration data of the image and restoration data of the related image.

7. The file processing device according to claim 6, wherein
the related image includes an image having a smaller number of pixels than a number of pixels of the image.

8. The file processing device according to claim 1, wherein
the HEIF file stores the image and metadata of the image.

9. A file processing method comprising
writing restoration data for restoring a high efficiency image file format (HEIF) file storing a still image into the HEIF file.

10. A program for causing a computer to function as
a file control unit that writes restoration data for restoring a high efficiency image file format (HEIF) file storing a still image into the HEIF file.

11. A file processing device comprising
a file control unit that uses restoration data for restoring a high efficiency image file format (HEIF) file storing a still image to restore the HEIF file into which the restoration data is written.

12. The file processing device according to claim 11, wherein
the restoration data includes data for restoring management metadata for managing the image in the HEIF file, and
the file control unit generates the management metadata by using the restoration data.

13. The file processing device according to claim 12, wherein
the file control unit deletes the image at an interrupted part where writing is interrupted from the HEIF file, and uses the restoration data to generate the HEIF file storing the image written before the interrupted part.

14. The file processing device according to claim 13, wherein
the restoration data for restoring the management metadata of the image is arranged immediately before the image,
the restoration data includes a size of the restoration data and a size of the image arranged immediately after the restoration data, and
the file control unit detects the image as the interrupted part in a case where a seek for a size obtained by combining a size of the restoration data and a size of the image arranged immediately after the restoration data from a top of the restoration data fails.

15. The file processing device according to claim 13, wherein
the HEIF file stores the image and a related image associated with the image, and
the file control unit deletes the image and the related image in a case where any one of the image and the related image is detected as the interrupted part.

16. The file processing device according to claim 15, wherein
the related image includes an image of which a number of pixels is smaller than a number of pixels of the image.

17. The file processing device according to claim 13, wherein
the HEIF file stores the image and metadata of the image, and
the file control unit deletes the image and the metadata in a case where any one of the image and the metadata is detected as the interrupted part.

18. The file processing device according to claim 12, wherein
the file control unit uses the restoration data to restore the management metadata stored in a pitm box, an infe box, a dimg box, a thmb box, a colr box, an hvcc box, an ipse box, an idat box, and an iloc box stored in a meta box of the HEIF file.

19. A file processing method comprising
using restoration data for restoring a high efficiency image file format (HEIF) file storing a still image to restore the HEIF file into which the restoration data is written.

20. A program for causing a computer to function as
a file control unit that uses restoration data for restoring a high efficiency image file format (HEIF) file storing a still image to restore the HEIF file into which the restoration data is written.

* * * * *